United States Patent
Saitoh

(10) Patent No.: US 6,636,192 B1
(45) Date of Patent: Oct. 21, 2003

(54) ELECTROOPTIC PANEL, PROJECTION DISPLAY, AND METHOD FOR MANUFACTURING ELECTROOPTIC PANEL

(75) Inventor: Hiromi Saitoh, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/622,838

(22) PCT Filed: Jan. 25, 2000

(86) PCT No.: PCT/JP00/00368

§ 371 (c)(1),
(2), (4) Date: Aug. 24, 2000

(87) PCT Pub. No.: WO00/45360

PCT Pub. Date: Aug. 3, 2000

(30) Foreign Application Priority Data

Jan. 28, 1999 (JP) ............................................. 11-020146
Jan. 28, 1999 (JP) ............................................. 11-020150

(51) Int. Cl.⁷ .......................... G09G 3/36; G02F 1/1339

(52) U.S. Cl. .......................... 345/87; 349/153; 349/155

(58) Field of Search ................................ 349/153, 155, 349/156, 157; 345/87

(56) References Cited

U.S. PATENT DOCUMENTS

| | | | | |
|---|---|---|---|---|
| 5,739,888 A | * | 4/1998 | Ogura et al. ................. | 349/155 |
| 6,013,339 A | * | 1/2000 | Yamada et al. .............. | 349/153 |
| 6,163,357 A | * | 12/2000 | Nakamura ................... | 349/155 |
| 6,219,126 B1 | * | 4/2001 | Von Gutfeld ................ | 349/153 |
| 6,226,067 B1 | * | 5/2001 | Nishiguchi et al. ......... | 349/155 |
| 6,275,280 B1 | * | 8/2001 | Kajita et al. ................ | 349/155 |
| 6,290,793 B1 | * | 9/2001 | Lovas et al. ................ | 156/99 |
| 6,292,249 B1 | * | 9/2001 | Kane et al. ................. | 349/155 |

FOREIGN PATENT DOCUMENTS

| | | |
|---|---|---|
| JP | A-57-17923 | 1/1982 |
| JP | 59-25513 U | 2/1984 |
| JP | A-62-192725 | 8/1987 |
| JP | 62-192725 | 8/1987 |
| JP | A-4-37720 | 2/1992 |
| JP | 04-037720 | 2/1992 |
| JP | 4-93823 U | 8/1992 |
| JP | 4-96779 U | 8/1992 |
| JP | 06-208119 | 7/1994 |
| JP | A-6-208119 | 7/1994 |
| JP | 09-22610 | 8/1997 |
| JP | A-9-222610 | 8/1997 |
| JP | A-10-148836 | 6/1998 |
| JP | 10-153797 | 6/1998 |
| JP | A-10-153797 | 6/1998 |

* cited by examiner

Primary Examiner—Steven Saras
Assistant Examiner—Paul Bell
(74) Attorney, Agent, or Firm—Oliff & Berridge PLC

(57) ABSTRACT

In order to provide an electro-optical panel in which the gap between the substrates is precise and is uniform over the entire image display region, a projection display apparatus using the electro-optical panel, and an electro-optical panel production method, a resin, which is elastically deformable even after being set, is applied to surround an image display region 37 on the surface of a TFT array substrate 2, and the resin is set, thereby forming an inner peripheral protrusion 22 and an outer peripheral protrusion 23 having circular portions 24. Subsequently, an unset sealing material 200 is applied in a rectangular area placed between the inner peripheral protrusion 22 and the outer peripheral protrusion 23. An unset conducting member 56 for continuity between the substrates is applied in areas enclosed by the circular portions 24 of the outer peripheral protrusion 23. While the protrusions 22, 23, and 24 are depressed to have a height of approximately 2 μm by pressing a counter substrate 3 against the TFT array substrate 2, the conducting member 56 and the sealing material 200 are set.

12 Claims, 21 Drawing Sheets

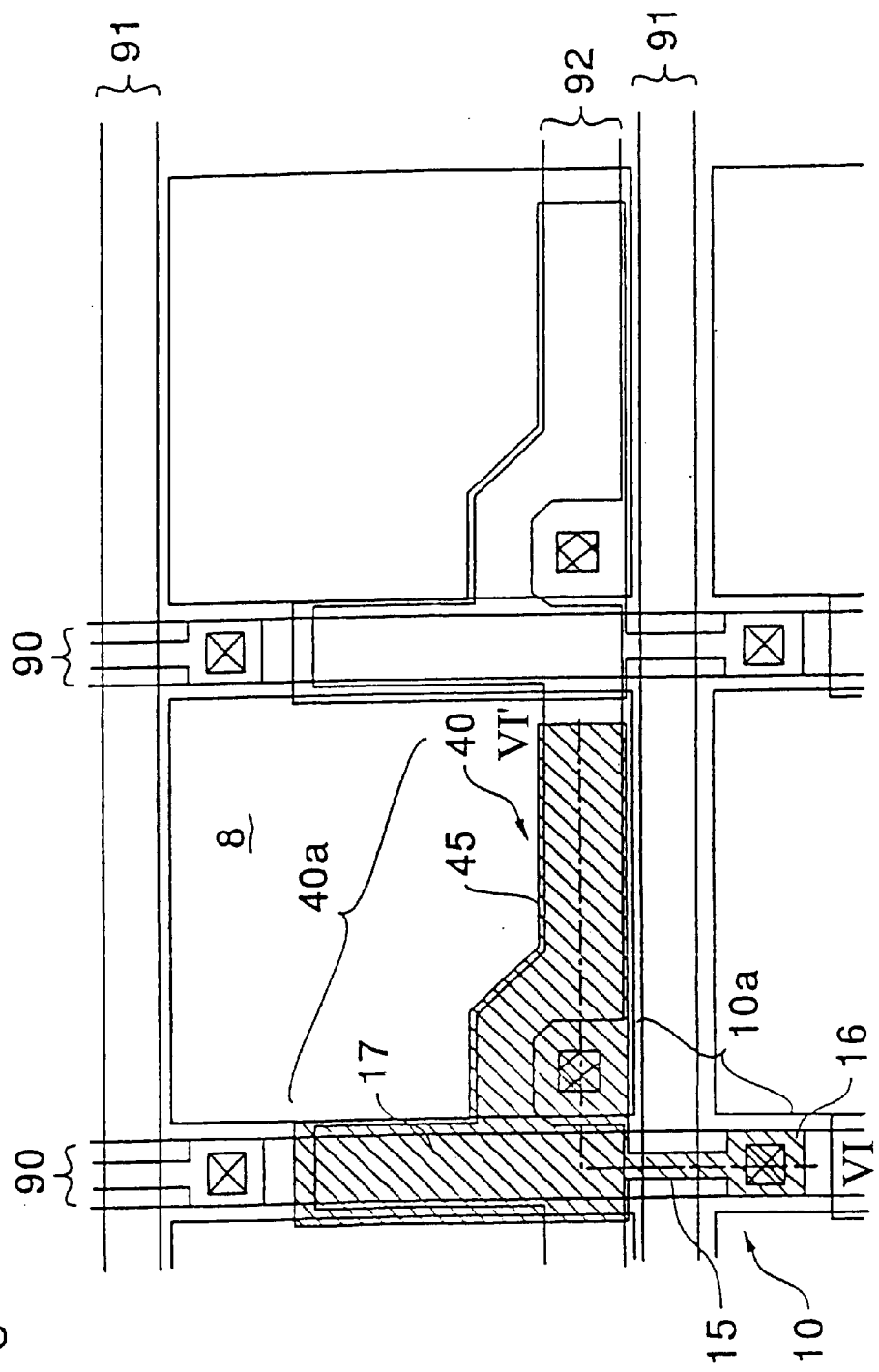

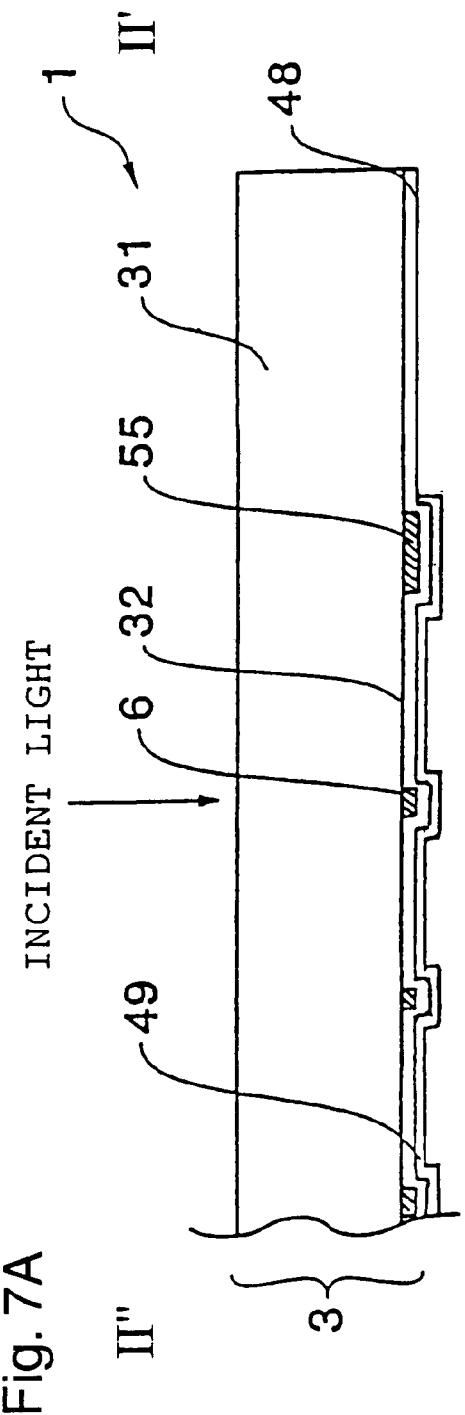
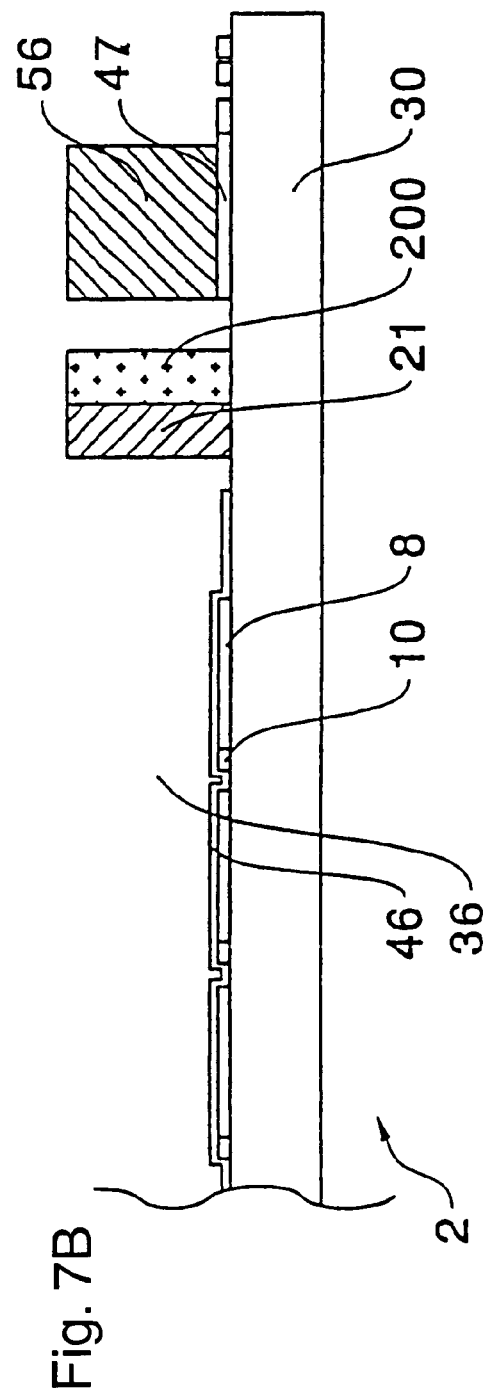
Fig. 7A
Fig. 7B

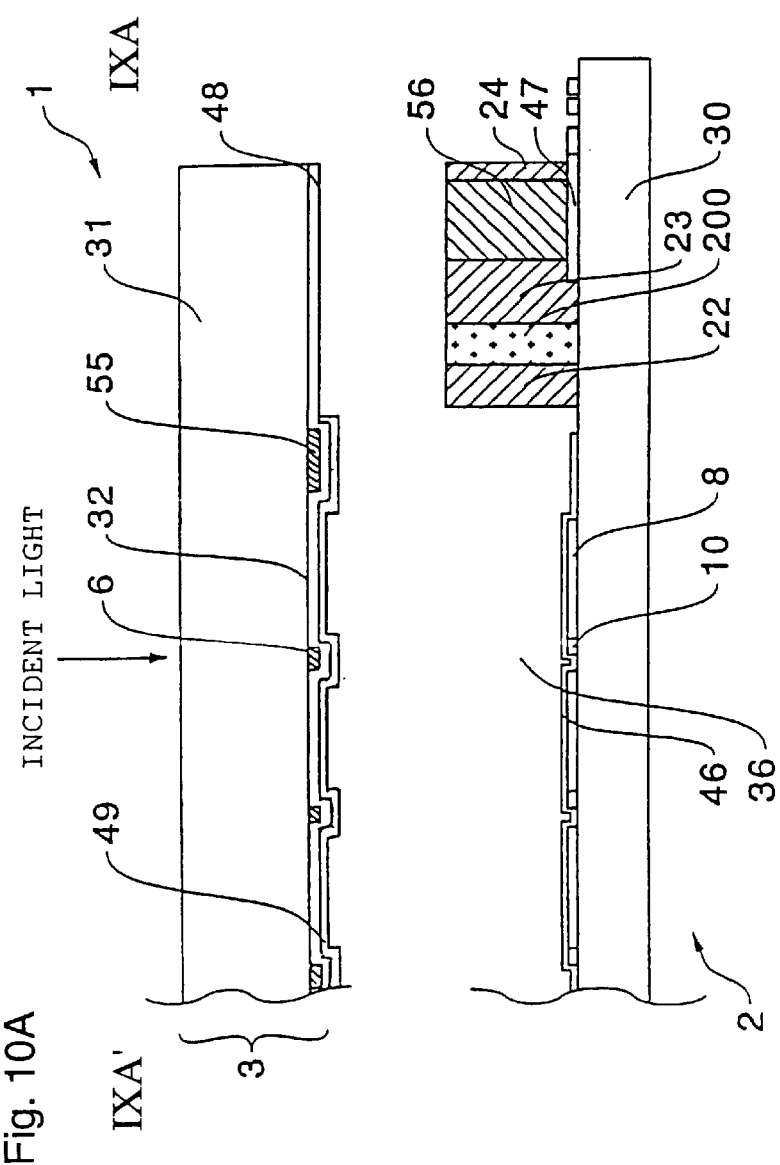
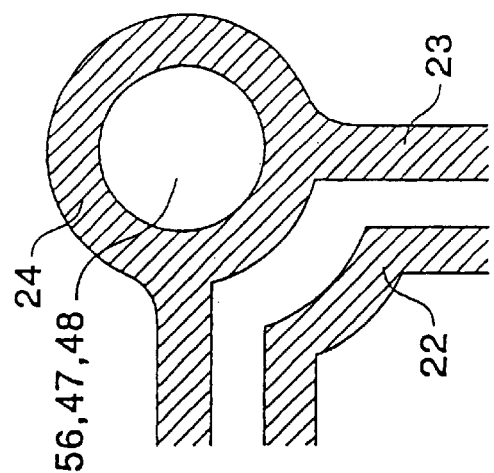

ELECTROOPTIC PANEL, PROJECTION DISPLAY, AND METHOD FOR MANUFACTURING ELECTROOPTIC PANEL

BACKGROUND OF THE INVENTION

1. Field of the Invention

The present invention relates to an electro-optical panel in which an electro-optical material, such as liquid crystal, is sealed between a pair of substrates, to a projection display apparatus using the electro-optical panel, and to an electro-optical panel production method. More particularly, the present invention relates to a technique for ensuring a predetermined gap between a pair of substrates.

2. Description of Related Art

As shown in FIG. 19 and FIG. 20, an electro-optical panel, in which an electro-optical material, such as liquid crystal, is sealed between a pair of substrates, generally comprises a thin-film transistor (hereinafter referred to as "TFT") array substrate (transistor array substrate) 2 in which pixel electrodes 8 and TFTs 10 for pixel switching are formed on the surface of a tansparent substrate made of silica glass or the like, a counter substrate 3 in which counter electrodes 32 are formed on the surface of a glass substrate having high heat resistance, such as Neoceram, and an electro-optical material 39, such as liquid crystal, sealed and held between the substrates as shown in FIG. 19 and FIG. 20. The TFT array substrate 2 and the counter substrate 3 are bonded with a predetermined gap therebetween by a sealing material 200' containing a gapping material, and an image display region 37 having the electro-optical material 39 sealed therein is divided in the gap by the sealing material 200'. Conventionally, an epoxy resin or acrylic resin adhesive component, with which glass beads or the like are mixed as a gapping material, is used as such a sealing material 200' containing a gapping material.

In the electro-optical panel 1' thus configured, the alignment state of the electro-optical material 39 is controlled pixel-by-pixel between the pixel electrodes 8 and the counter electrodes 32 according to image signals applied to the pixel electrodes 8 via data lines (not shown) and the TFTs 10 on the TFT array substrate 2, thereby displaying a predetermined image corresponding to the image signals. Therefore, in the TFT array substrate 2, it is necessary to supply image signals to the pixel electrodes 8 via the data lines and the TFTs 10, and to also apply a predetermined potential to the counter electrodes 32.

Accordingly, in the electro-optical panel 1', a first electrode 47 for continuity between the substrates is formed on the TFT array substrate 2 by using a process for forming data lines, a second electrode 48 for continuity between the substrates is formed on the counter substrate 3 by using a process for forming the counter electrodes 32, and the first electrode 47 and the second electrode 48 for continuity between the substrates are electrically conducted by a conducting member 56 obtained by mixing an epoxy resin or acrylic resin adhesive component with conductive particles such as silver powders and gold-plated fibers. For this reason, in the electro-optical panel 1', predetermined signals can be input to both the TFT array substrate 2 and the counter substrate 3 by connecting a flexible wiring board 99 or the like only to input and output terminals 45 of the TFT array substrate 2, instead of connecting a flexible wiring board to both the TFT array substrate 2 and the counter substrate 3.

SUMMARY OF THE INVENTION

Although attempts have been made to improve display quality by reducing the gap (cell gap) between the TFT array substrate 2 and the counter substrate 3 to approximately 2 μm in the electro-optical panel 1', if such a small cell gap is ensured only by the gapping material contained in the peripheral sealing material 200', it varies substantially because it is small. As a result, the layer of the electro-optical material 39 significantly varies in thickness, and therefore, the display screen becomes unnaturally bright and dark and the response speed of the electro-optical material 39 varies. This deteriorates display quality on the contrary.

Accordingly, a structure may be conceived in which the cell gap is controlled by scattering spacers in the image display region 37. However, when the electro-optical panel 1', in which the spacers are scattered throughout the image display region 37, is used in a projection display apparatus, since light transmittance is reduced at the portions where the scattered spacers are dense, such defects are magnified and projected onto a screen.

In consideration of the above problems, an object of the present invention is to provide an electro-optical panel in which the gap is precise and is uniform over the entire image display region, a projection display apparatus using the electro-optical panel, and an electro-optical panel production method.

In order to overcome the above problems, the present invention provides an electro-optical panel wherein an electro-optical material is held between a pair of substrates, the pair of substrates are fixedly bonded by a sealing material, and an image display region composed of a plurality of pixels is formed inside an area where the sealing material is formed, and wherein one of the pair of substrates has a protrusion projecting into contact with the other substrate, and the protrusion is formed in an area surrounding the pixel region.

In this invention, since the gap (cell gap) between the substrates is controlled by contacting the protrusion formed on one of the substrates with the other substrate, it is possible to control the gap more precisely than in a structure in which the gap is controlled by a gapping material contained in the sealing material. Since the protrusion is formed to surround the image display region, it is possible to avoid variations in the gap between the substrates over the entire image display region. For this reason, it is possible to achieve an electro-optical panel in which the gap is precise, even if the gap is small, and is uniform over the entire image display region. Since it is unnecessary for the sealing material to contain the gapping material, even when wires are disposed on the lower side of the sealing material, they can be prevented from being crushed and broken by the gapping material.

In this invention, for example, the protrusion may be formed along one of an inner peripheral edge and an outer peripheral edge of the sealing material formation area In this invention, it is preferable that the protrusion include a first protrusion formed along the inner peripheral edge of the sealing material formation area, and a second protrusion formed along the outer peripheral edge, and that the sealing material be formed in an area disposed between the first protrusion and the second protrusion. Since the sealing material is blocked by the first protrusion and the second protrusion in such a structure, even when unset sealing material is applied or when the sealing material is heated, it does not extrude into an undesirable area. For this reason, a thermosetting sealing material can be used.

According to another aspect, the present invention provides an electro-optical panel wherein an electro-optical material is held between a pair of substrates, the pair of substrates are fixedly bonded by a sealing material, and an image display region composed of a plurality of pixels is formed inside a region where the sealing material is formed, and wherein one of the pair of substrates has a protrusion projecting into contact with the other substrate, and the protrusion is formed around a formation region of a conducting members for electrically connecting conductive layers respectively formed on the pair of substrates.

For example, it is preferable that the protrusion be formed to surround the conducting member. In such a structure, since the conducting member is blocked by the protrusion, when an unset conducting member is applied or when the conducting member is heated, it does not extrude into an undesirable area. For this reason, a thermosetting adhesive component can be used for the conducting member.

The sealing material may be formed so that at least a part thereof overlaps with a shielding film formed on the periphery of the image display region. In such a structure, since the sealing material is extended to the shielding film, adhesion of the sealing material can be enhanced.

In this invention, it is preferable that the protrusion be made of an elastically deformable material and be depressed between the pair of substrates. In such a structure, a force for enlarging the space between the substrates is applied so that the depressed protrusion returns to its initial shape, whereas the substrates are fixed by the sealing material. Therefore, the gap between the substrates can be made uniform.

In this invention, the pair of substrates may include, for example, a transistor array substrate having pixel electrodes and thin-film transistors for pixel switching formed in a matrix, and a counter substrate having counter electrodes.

In a projection display apparatus (electro-optical device) using such an electro-optical panel, there are placed a light source, a light-collecting optical system for guiding light emitted from the light source to the electro-optical panel, and a magnified projection optical system for magnifying and projecting light modulated by the electro-optical panel.

In an electro-optical panel production method of the present invention, the protrusion is formed on one of the pair of substrates, and the sealing material is then applied and set while pressing the pair of substrates.

In the electro-optical panel production method of this invention, preferably, a first protrusion and a second protrusion are formed along the inner peripheral edge and the outer peripheral edge of an area where the sealing material is to be formed, and the sealing material is applied in an area placed between the first protrusion and the second protrusion, and is set while pressing the pair of substrates. In such a structure, when an unset sealing material is applied, it is blocked by the protrusions and does not extrude into an undesirable area.

In the electro-optical panel production method of this invention, preferably, after the protrusions are formed to surround an area where the conducting member is to be formed, the conducting member is applied in the area surrounded by the protrusions, and the sealing material and the conducting member are simultaneously or separately set while pressing the pair of substrates. In such a structure, when an unset conducting member is applied, it is blocked by the protrusions and does not extrude into an undesirable area.

In the electro-optical panel production method of this invention, preferably, the protrusions are made of an elastically deformable material on one of the substrates, the sealing material is applied on the substrate, the protrusions are elastically deformed by pressing the pair of substrates, and the sealing material is set in this state.

The present invention also provides an electro-optical panel wherein an electro-optical material is held between a pair of substrates, the pair of substrates are fixedly bonded by a sealing material, and an image display region composed of a plurality of pixels is formed inside an area where the sealing material is formed, and wherein one of the pair of substrates has protrusions projecting into contact with the other substrate, and the protrusions are scattered at predetermined positions in the image display region.

In this invention, since the gap (cell gap) between the substrates is controlled by contacting the protrusions formed on one of the substrates with the other substrate, it is possible to control the gap more precisely than in the structure in which the gap is controlled by the gapping material contained in the sealing material. Since the protrusions are formed to be scattered throughout the image display region, the gap between the substrates does not vary over the entire image display region. For this reason, it is possible to achieve an electro-optical panel in which the gap is precise, even if the gap is small, and is uniform over the entire image display region. In such an electro-optical panel, even when the protrusions are formed in the image display region, they are not concentrated in particular areas. Furthermore, since it is unnecessary for the sealing material to contain the gapping material, even when wires are disposed on the lower side of the sealing material, they can be prevented from being crushed and broken by the gapping material.

In this invention, it is preferable that the protrusions be formed in non-aperture areas, which do not transmit light, of the respective pixels formed in the image display region. In such a structure, even when the protrusions are formed in the image display region, they are not projected on a display. Accordingly, this invention is effective when using the electro-optical panel as a light valve in a projection display apparatus.

In this invention, it is preferable that the protrusions be formed at the same point in the respective pixels formed in the image display region. That is, it is preferable that the protrusions be formed at the same coordinates in the respective pixels. In such a structure, since the protrusions are formed at the same height in the pixels, it is possible to make the gap between the substrates more uniform. For this reason, even when an uneven substrate is used, a constant gap can be ensured between the substrate and another substrate.

In this invention, it is preferable that the protrusions be cylindrical. In such a structure, when an electro-optical material, such as liquid crystal, is filled, it smoothly flows along the protrusions, so that insufficient filling of the electro-optical material does not occur.

In this invention, it is preferable that the protrusions be formed at a higher density in the peripheral area of the image display region than in the central area. In such a structure, the center of the panel sometimes bulges according to the timing at which the electro-optical material, such as liquid crystal, is injected between the substrates. It is preferable to bond the substrates in anticipation of such a bulge. That is, the gap between the substrates is small in the central area of the image display region immediately after the substrates are bonded, whereas the central area bulges when the electro-optical material is injected into the image display region. Even if the gap in the area increases slightly, such an increase is absorbed and reduced by the difference in gap before the electro-optical material is injected. For this reason, it is possible to make the gap between the substrates uniform over the entire image display region.

In this invention, it is preferable that the protrusions be formed at a higher density in one area of the image display region than in another area. When producing the electro-optical panel of this invention, protrusions are formed on one of the substrates, and a sealing material is applied and is set while applying a force to reduce the gap between the pair of substrates. In a case in which an area, where the force always increases or decreases when pressing the substrates, is known, the protrusions are formed at a density sufficient to absorb and reduce the increase or decrease. That is, since the protrusions are formed in a predetermined distribution on one of the substrates based on the aptness of a device for bonding the substrates, it is possible to make the gap between the substrates uniform over the entire image display region.

In this invention, it is preferable that the protrusions be made of an elastically deformable material and be depressed between the pair of substrates. In such a structure, a force for enlarging the space between the substrates is applied so that the depressed protrusions return to their initial shape, whereas the substrates are fixed by the sealing material. Therefore, the gap between the substrates can be made uniform.

In this invention, the pair of substrates may include, for example, a transistor array substrate having pixel electrodes and thin-film transistors for pixel switching formed in a matrix, and a counter substrate having counter electrodes.

In a projection display apparatus (electro-optical device) using such an electro-optical panel, there are placed a light source, a light-collecting optical system for guiding light emitted from the light source to the electro-optical panel, and a magnified projection optical system for magnifying and projecting light modulated by the electro-optical panel.

In an electro-optical panel production method of the present invention, after the protrusions are formed on one of the pair of substrates, the sealing material is applied and set while pressing the pair of substrates.

In the electro-optical panel production method of this invention, preferably, after the protrusions are made of an elastically deformable material on one of the substrates, the sealing material is applied on the substrate, the protrusions are elastically deformed by pressing the pair of substrates, and the sealing material is set in this state. In such a structure, a force for enlarging the space between the substrates is applied so that the depressed protrusions return to their initial shape, whereas the substrates are fixed by the sealing material. Therefore, the gap between the substrates can be made uniform.

The present invention provides an electro-optical panel wherein an electro-optical material is held between a pair of substrates, the pair of substrates are fixedly bonded by a sealing material, and an image display region composed of a plurality of pixels is formed inside a region where the sealing material is formed, and wherein one of the pair of substrates has a protrusion projecting into contact with the other substrate, and the protrusion is formed to face a shielding film formed in an area surrounding the pixel region.

According to this invention, since the gap (cell gap) between the substrates is controlled by contacting the protrusion formed on one of the substrates with the other substrate, it is possible to control the gap more precisely than in a structure in which the gap is controlled by the gapping material contained in the sealing material. Since the protrusion is formed to surround the image display region, it is possible to avoid variations in gap between the substrates over the entire image display region. Furthermore, since the protrusion is formed to face the shielding film, it is possible to provide the protrusion while effectively using a non-display region.

In this invention, the protrusion may be placed within the width of the shielding film in plan view. According to this invention, since the protrusion is placed within the width of the shielding film in plan view, it is possible to prevent the protrusion from affecting the display region.

BRIEF DESCRIPTION OF THE DRAWINGS

FIG. 5 is a plan view showing some of the pixels in the electro-optical panel shown in FIG. 1.

FIG. 7 is a cross-sectional view showing a state immediately before the substrates are bonded, as shown in FIG. 3.

FIGS. 10(A) and 10(B) are a cross-sectional view of an end portion of the electro-optical panel showing a state before the substrates are bonded, as shown in FIG. 9(A), and a plan view showing the continuity section between the substrates.

DETAILED DESCRIPTION OF THE EMBODIMENTS

Embodiments of the present invention will be described with reference to the drawings. In an electro-optical panel according to the embodiments, components common to those in the conventional electro-optical panel are described with like numerals.

First Embodiment
(Overall Configuration of Electro-optical Panel)

Figure 1:
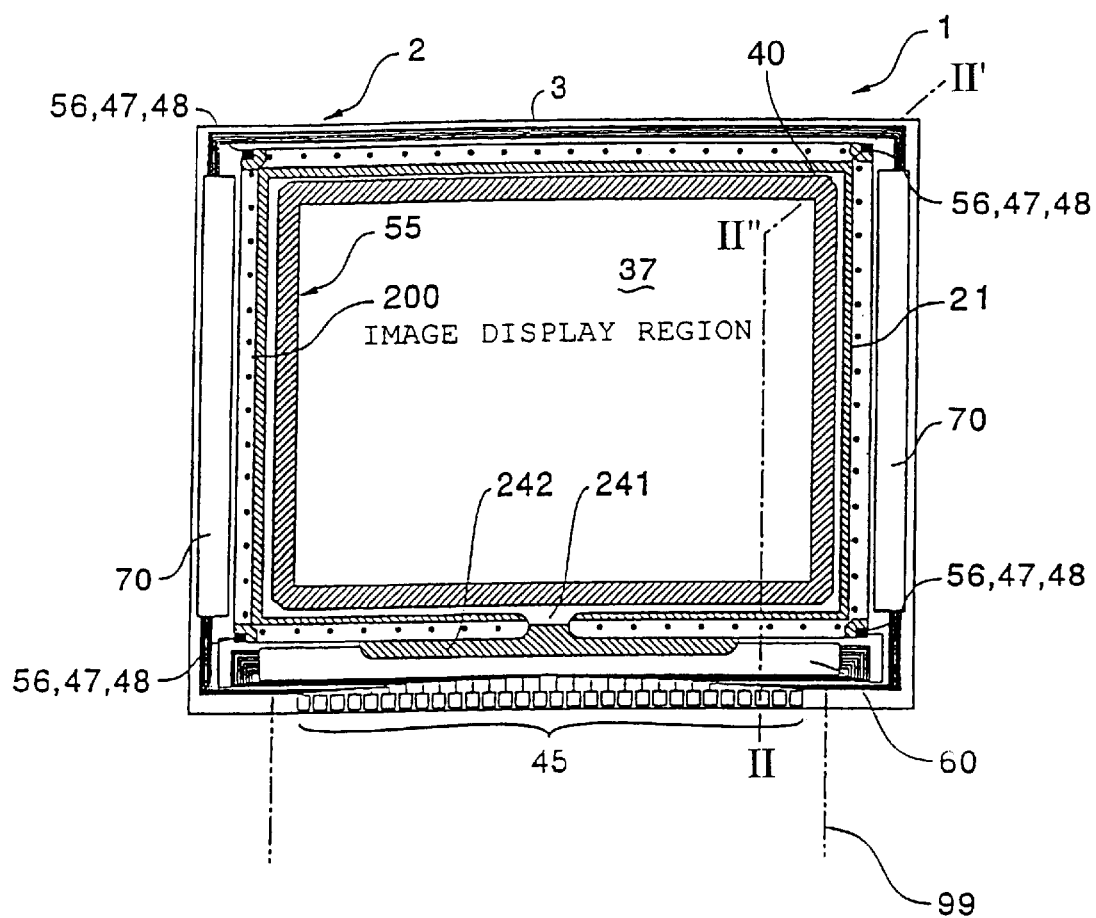
FIG. 1 is a plan view of an electro-optical panel according to a first embodiment of the present invention, as viewed from the side of a counter substrate.
Figure 2:
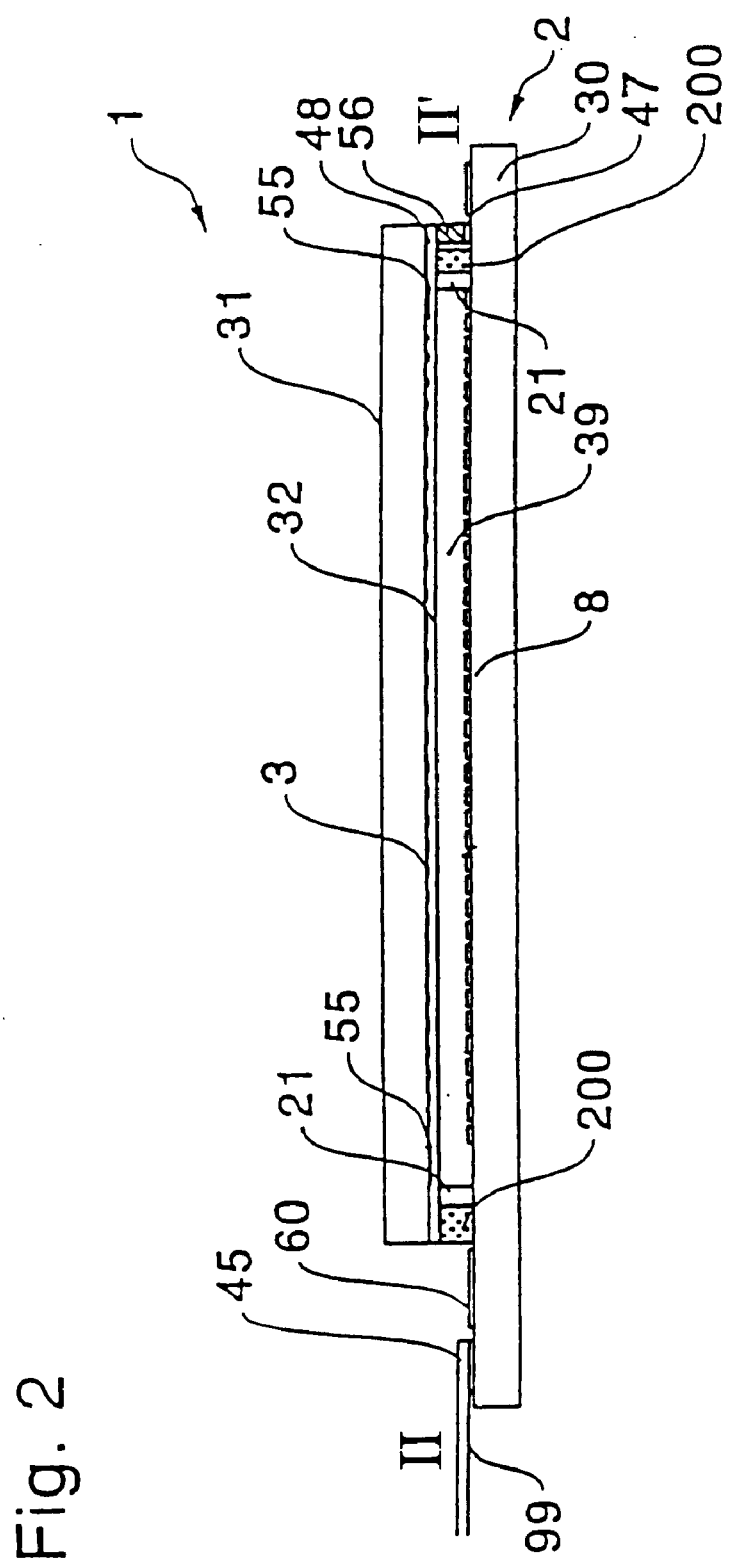
FIG. 2 is a cross-sectional view of the electro-optical panel, taken along line II—II in FIG. 1.
Figure 3:
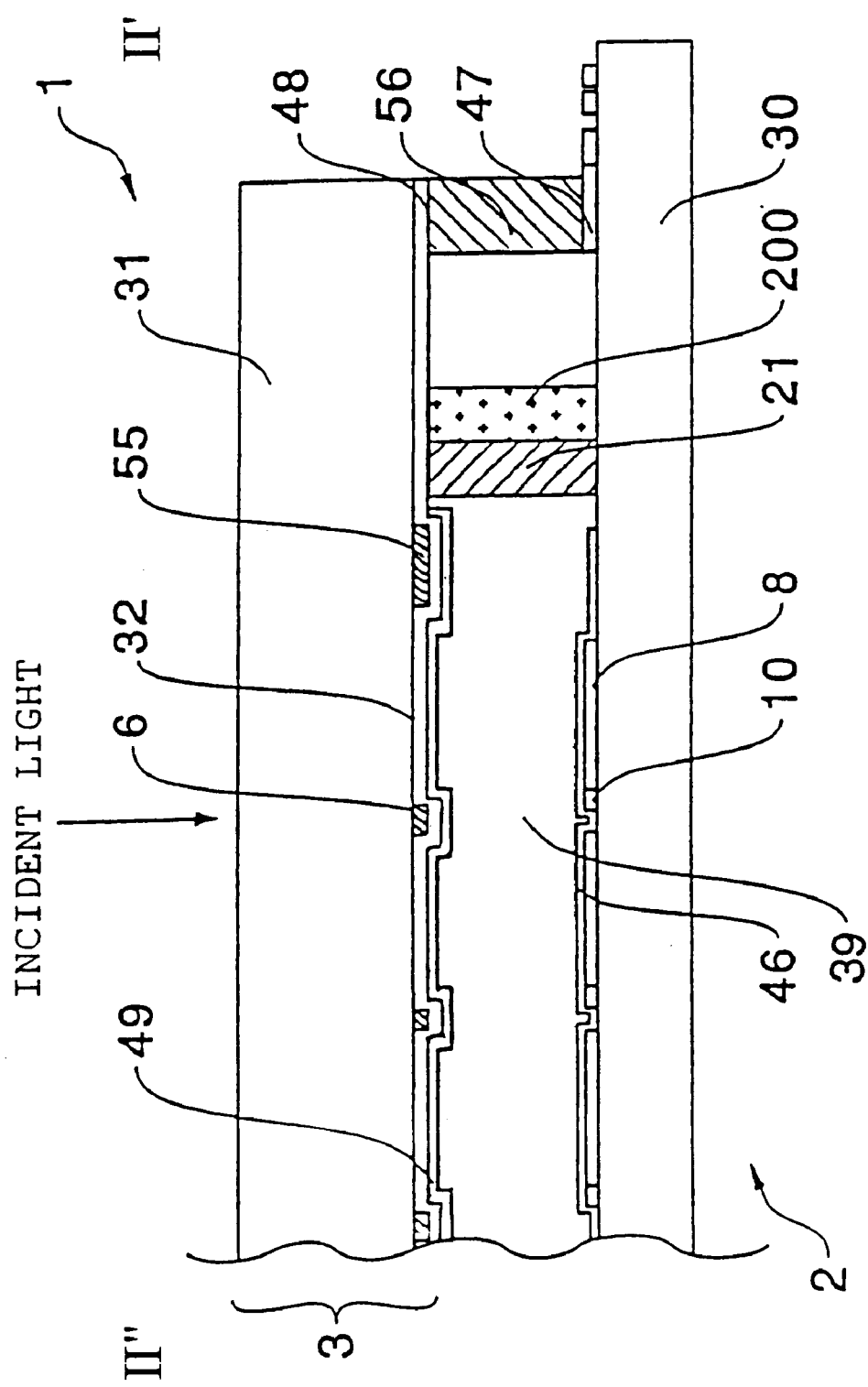
FIG. 3 is a cross-sectional view of an end portion of the panel, taken along line II—II in FIG. 1, showing a TFT array substrate, a counter substrate, and a bonding structure for the substrates.

FIG. 1 is a plan view of an electro-optical panel according to this embodiment, as viewed from the side of a counter substrate. FIG. 2 is a sectional view of the electro-optical panel, taken along line II—II in FIG. 1. FIG. 3 is a sectional view of an end portion of the electro-optical panel of this embodiment, showing a TFT array substrate and a counter substrate used in the electro-optical panel, and a bonding structure therefor.

As shown in FIGS. 1, 2, and 3, an electro-optical panel 1 for use in a projection display apparatus and the like generally may consist of a TFT array substrate 2 in which transparent pixel electrodes 8 are formed in a matrix on the surface of a silica glass 30, a counter substrate 3 in which transparent counter electrodes 32 are similarly formed on the surface of a silica glass 31, and an electro-optical material 39, such as liquid crystal, sealed and held between the substrates.

The TFT array substrate 2 and the counter substrate 3 are bonded with a predetermined gap therebetween by a sealing material 200 formed along the outer peripheral edge of the counter substrate 3. Between the TFT array substrate 2 and the counter substrate 3, an electro-optical material sealed region 40 is divided by the sealing material 200, and the electro-optical material 39, such as liquid crystal, is sealed in the image display region 37.

In this embodiment, the gap (cell gap) between the TFT array substrate 2 and the counter substrate 3 is ensured by a protrusion protruding from the TFT array substrate 2 toward the counter substrate 3, as will be described later. Therefore, it is unnecessary for the sealing material 200 used in this embodiment to contain a gapping material, which differs from the conventional art.

In the electro-optical panel 1, the counter substrate 3 is smaller than the TFT array substrate 2, and the substrates are bonded so that the peripheral portion of the TFT array substrate 2 is exposed outside the outer peripheral edge of the counter substrate 3. Therefore, driving circuits (a scanning-line driving circuit 70 and a data-line driving circuit 60) and input and output terminals 45 of the TFT array substrate 2 are exposed from the counter substrate 3, and this allows a flexible wiring board 99 to be connected to the input and output terminals 45. The sealing material 200 is locally broken, and this broken portion forms an electro-optical material inlet 241. Therefore, the electro-optical material 39 can be injected through the electro-optical material inlet 241 under reduced pressure by reducing the pressure in an area inside the sealing material 200 after the counter substrate 3 and the TFT array substrate 2 are bonded. After the electro-optical material 39 is sealed in, the electro-optical material inlet 241 is filled with a sealant 242. The counter substrate 3 is provided with a shielding film 55 formed around the image display region 37 inside an area where the sealing material 200 is formed. The counter substrate 3 is also provided with a shielding film 6 formed in an area corresponding to a boundary area between the pixel electrodes 8 on the TFT array substrate 2.

The electro-optical panel 1 of this embodiment is used in, for example, a projection display apparatus (projector). In this case, three electro-optical panels 1 are used as R, G, and B light valves, respectively. Colored light separated via a dichroic mirror for separating R, G, and B colors enters each of the electro-optical panels 1 as projection light. Therefore, the electro-optical panel 1 of this embodiment is not provided with a color filter. However, a color display device other than the projection display apparatus, such as a color liquid crystal television, can be constructed by forming R, G, and B color filters with their protective films in the areas of the counter substrate 3 facing the pixel electrodes 8. Furthermore, a dichroic filter for producing R, G, and B colors by using light interference may be formed by stacking plural interference layers having different refractive indices on the counter substrate 3. The counter substrate with the dichroic filter permits a brighter color display. On the light incident surfaces or on the light emitting sides of the counter substrate 3 and the TFT array substrate 2, a polarizing film, a retardation film, a polarizer, and the like are placed in predetermined alignments according to the type of the electro-optical material 39, that is, the operation modes, such as a TN (twisted nematic) mode, an STN (super TN) mode, and a D-STN (double-STN) mode, and a normally white mode or a normally black mode.

In the electro-optical panel 1 thus configured, the alignment state of the electro-optical material 39 between the pixel electrodes 8 and the counter electrodes 32 in the TFT array substrate 2 is controlled pixel-by-pixel by image signals applied to the pixel electrodes 8 via data lines (not shown) and TFTs 10, thereby displaying a predetermined image corresponding to the image signals. Therefore, it is necessary in the TFT array substrate 2 to supply image signals to the pixel electrodes 8 via the data lines and the TFTs 10, and to apply a predetermined potential to the counter electrodes 32.

Accordingly, in the electro-optical panel 1, first electrodes 47 made of an aluminum film (a shielding material) for continuity between the substrates are formed on the portions of the surface of the TFT array substrate 2 facing the corners of the counter substrate 3 by using a formation process of the data lines or the like. On the other hand, second electrodes 48 made of a transparent conductive film (Indium Tin Oxide: ITO film) for continuity between the substrates are formed at the corners of the counter substrate 3 by using a formation process of the counter electrodes 3. Furthermore, the first electrodes 47 and the second electrodes 48 for continuity between the substrates are electrically conducted by a conducting member 56 obtained by mixing conductive particles, such as silver powders or gold-plated fibers, with an adhesive component of epoxy resin or acrylic resin. For this reason, predetermined signals can be input to both the TFT array substrate 2 and the counter substrate 3 in the electro-optical panel 1 by connecting a flexible wiring board 99 only to the TFT array substrate 2, instead of connecting a flexible wiring board to both the TFT array substrate 2 and the counter substrate 3.

(Configuration of TFT Array Substrate)

Figure 4:
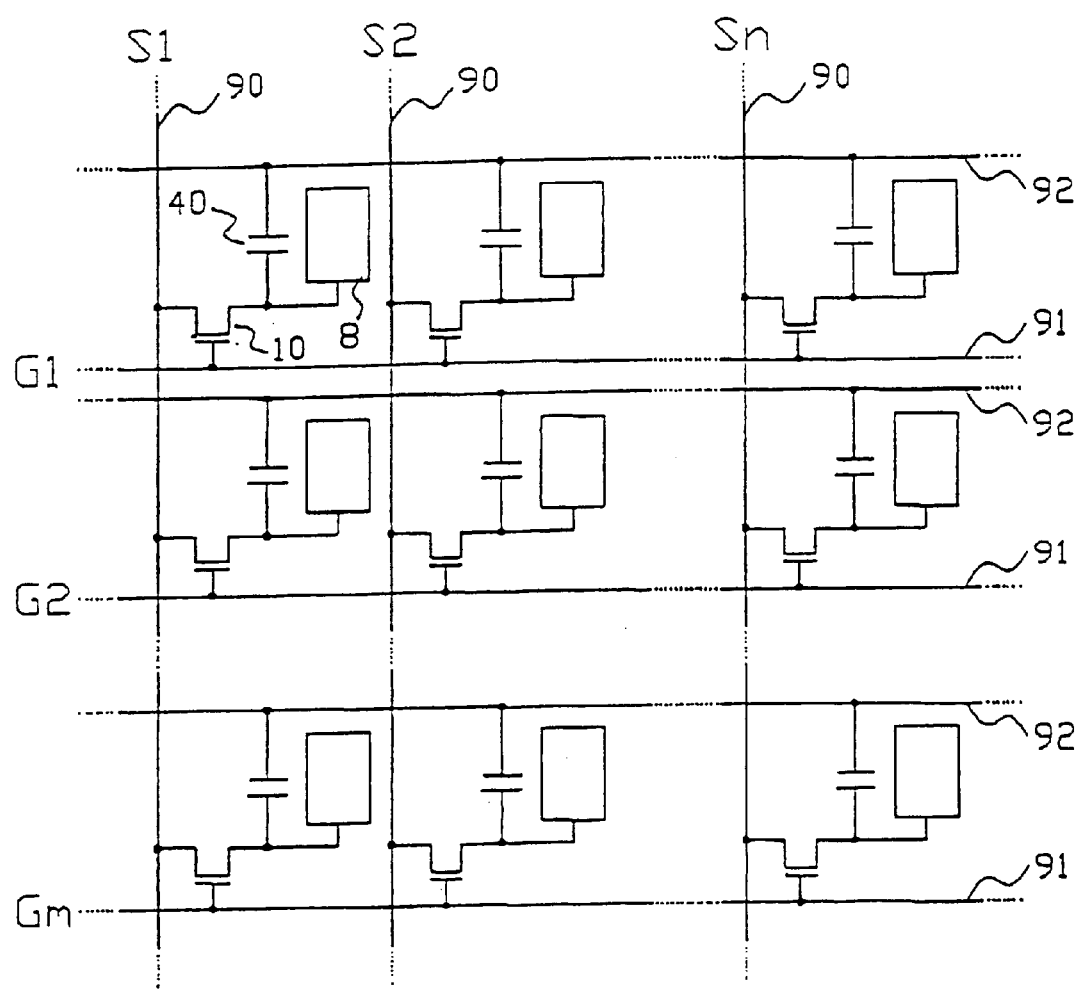
FIG. 4 is a block diagram schematically showing the configuration of the electro-optical panel shown in FIG. 1.
Figure 6A:
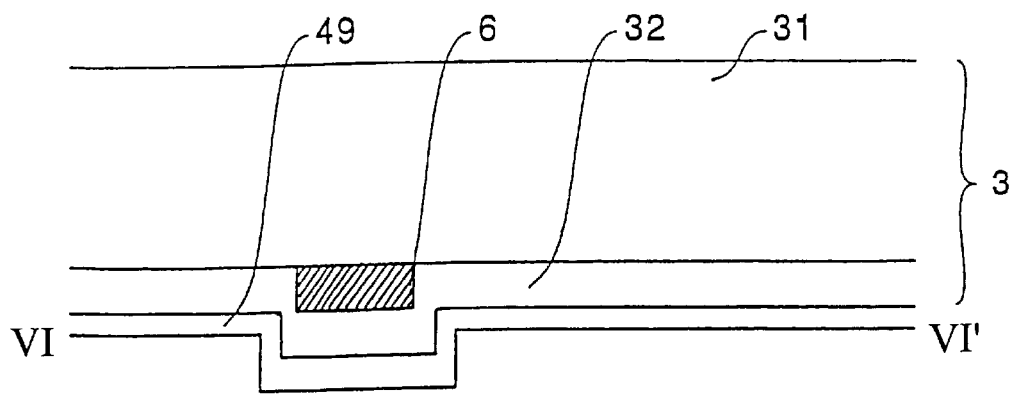
FIG. 6 is a sectional view of the electro-optical panel, taken at a position corresponding to line VI—VI in FIG. 5.
Figure 6B:
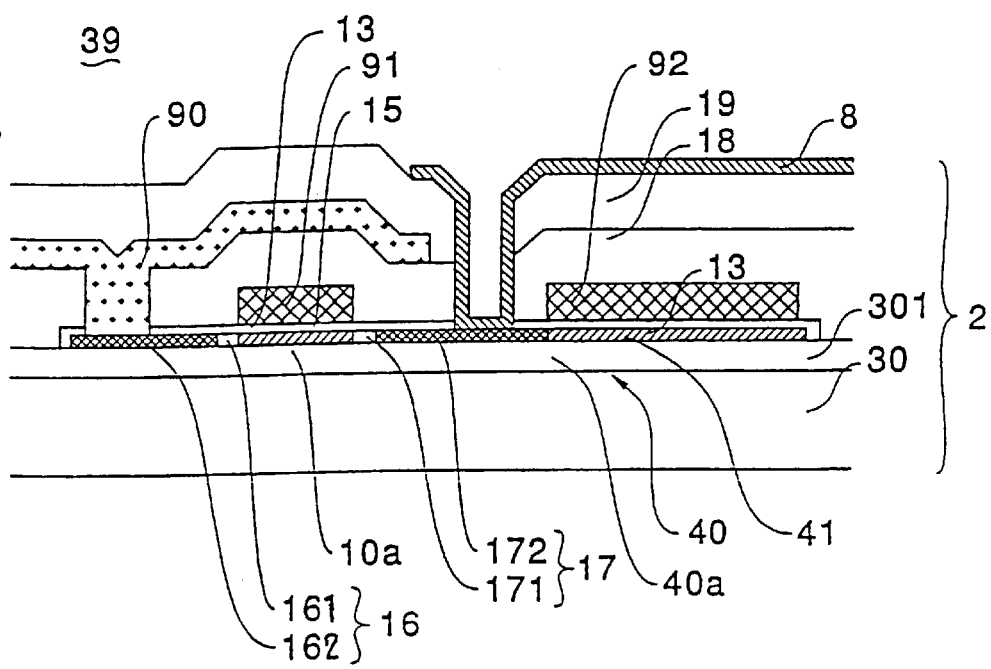

FIG. 4 is a block diagram schematically showing the configuration of the electro-optical panel, FIG. 5 is a plan view of some of the pixels in the electro-optical panel, and FIG. 6 is a sectional view of the TFT array substrate, taken along line VI—VI in FIG. 5.

As shown in FIGS. 1 and 4, each of the plurality of pixels, which are formed in a matrix so as to constitute the image display region 37 in the electro-optical panel 1 of this embodiment, is composed of a scanning line 91, a data line 90, a pixel electrode 8, and a TFT 10 for controlling the pixel electrode 8. The data lines 90, to which image signals are supplied, are electrically connected to sources of the TFTs 10. Scanning signals G1, G2, . . . , Gm are applied in pulse form and in that order in line sequence to the scanning lines 91 for the TFTs 10. The pixel electrodes 8 are electrically connected to drains of the TFTs 10. By switching the TFTs 10 off for a fixed period, image signals S1, S2, . . . , Sn supplied from the data lines 90 are written at a predetermined timing. The image signals S1, S2, . . . , Sn of the predetermined level written in the liquid crystal via the pixel electrodes 8 are held for a predetermined period between the liquid crystal and the counter electrodes 32 formed on the counter substrate 3. By using changes in alignment and order of molecular group according to the level of the voltage to be applied, the electro-optical material 39 modulates light, and permits gray-scale display. In order to prevent the held image signals from leaking, storage capacitances 40 are added in parallel with the electro-optical material formed between the pixel electrodes 8 and the counter electrodes 32. The storage capacitances 40 may be thus formed by providing capacitance lines 92 serving as wires for forming the capacitances, or by forming the capacitances between the pixels and the upstream scanning lines 91, as will be described later.

FIG. 5 is a plan view of some of the pixels. The data line 90 is electrically connected, via a contact hole, to a source region 16 of a semiconductor layer formed of a polysilicon film, and the pixel electrode 8 is electrically connected to a drain region 17 via a contact hole. The scanning line 91 extends to face a channel region 15. The storage capacitance 40 has a structure in which a capacitance line 92 serving as an upper electrode is laid on a lower electrode 41 formed by making a silicon film 40a (a semiconductor film/a diagonally shaded area in FIG. 5) conductive, corresponding to an extended portion of a silicon film 10a (a semiconductor film/a diagonally shaded area in FIG. 5) for forming the TFT 10 for pixel switching.

FIG. 6 shows a cross section of a pixel thus constructed, taken along line, VI—VI. An underlying protective film 301 having insulation performance is formed on the surface of the silica glass 30 serving as a base of the TFT array substrate 2. The island-shaped silicon films 10a and 40a are formed on the surface of the underlying protective film 301. A gate insulating film 13 is formed on the surface of the silicon film 10a, and the scanning line (gate electrode) 91 is formed thereon. An area of the silicon film 10a facing the scanning line 91 via the gate insulating film 13 functions as the channel region 15. The source region 16 including a low-density source region 161 and a high-density source region 162 is formed on one side of the channel region 15, and the drain region 17 including a low-density drain region 171 and a high-density drain region 172 is formed on the other side. A first layer insulating film 18 and a second layer insulating film 19 are formed on the front side of the TFT 10 thus structured for pixel switching. The data line 90 formed on the surface of the first layer insulating film 18 is electrically connected to the high-density source region 162 via a contact hole formed in the first layer insulating film 18. The pixel electrode 8 is electrically connected to the high-density drain region 172 via contact holes formed in the first layer insulating film 18 and the second layer insulating film 19. The lower electrode 41 formed of the high-density region extended from the high-density drain region 172 is formed on the silicon film 40a The capacitance line 92 faces the lower electrode 41 via an insulating film (dielectric film) formed simultaneously with the gate insulating film 13. The storage capacitance is formed in this way.

While the TFT 10 has, preferably, an LDD structure, as described above, it may have an offset structure. Alternatively, the TFT 10 may be of a self-aligned type in which high-density source and drain regions are formed in a self-aligned manner by implanting ionized impurities at high density with the scanning line 91 used as a mask. A shielding film 6, a counter electrode 32, and an alignment film 49 are formed in that order on a part of the counter substrate 3 opposing the TFT 10 for pixel switching.

(Control of Gap between Substrates)

In the electro-optical panel 1 thus configured according to this embodiment, a protrusion 21 is formed along the inner peripheral edge of the region where the sealing material 200 is formed, on the surface of the TFT array substrate 2 (the surface for holding the electro-optical material 39) so as to surround the image display region 37, as shown in FIGS. 1, 2, and 3. The protrusion 21 projects into contact with the counter substrate 3, thereby ensuring a gap (cell gap) of 2 $\mu$m between the TFT array substrate 2 and the counter electrode 3. That is, the protrusion 21 is made of an elastically deformable material, and is crushed between the TFT array substrate 2 and the counter electrode 3 that are fixedly bonded by the sealing material 200.

(Production Method)

This state will be described in detail in connection with a production method of the electro-optical panel 1, with reference to FIGS. 1, 2, 3, and 7. FIG. 7 is a sectional view showing a state immediately before the substrates are bonded as shown in FIG. 3.

When producing the electro-optical panel 1 of this embodiment, first, in order to form the counter substrate 3, the shielding film 6 and the counter electrodes 32 are sequentially formed on the surface of the insulating substrate made of the silica glass 31 or the like, and a polyimide resin 49 is then thinly applied on the surfaces of the counter electrodes 32 so as to form an alignment film. Next, the polyimide resin 49 is thermally set at a temperature of approximately 150° C. to 200° C. After the polyimide resin layer 49 is thus formed on the counter substrate 3, rubbing is performed.

On the other hand, in order to form the TFT array substrate 2, first, the TFTs 10 and the pixel electrodes 8 are sequentially formed on the surface of the silica glass 30 by using a well-known semiconductor process.

Next, a resin, which is elastically deformable even after being set, is applied over the entire surface of the TFT array substrate 2, and is subjected to patterning by photolithography, thereby forming the protrusion 21 in an area surrounding the image display region 37. When a target gap between the substrates is, for example, 2 $\mu$m, the protrusion 21 is formed to have a slightly larger thickness than the target gap (2 $\mu$m).

Subsequently, a polyimide resin 46 is thinly applied on the surface of the TFT array substrate 2 so as to form an alignment film, and rubbing is performed.

Next, an unset sealing material 200 is discharged from a dispenser and is applied onto the surface of the TFT array substrate 2 so as to surround the protrusion 21. Moreover, an unset conducting member 56 for conducting the substrates is discharged from a dot dispenser and is applied on a part of the surface of the TFT array substrate 2 slightly offset outward from the application region of the sealing material 200. In this embodiment, a photo-curable or thermosetting adhesive component of epoxy resin or acrylic resin containing conductive particles of silver powders or gold-plated fibers is used as the conducting member 56. As the sealing material 200, a photo-curable or thermosetting adhesive of epoxy resin or acrylic resin is used in a manner similar to that of the conductive material 56. The sealing material 200 does not contain a gapping material. Since it is unnecessary for the sealing material 200 to contain the gapping material, even when wires are disposed on the lower side of the sealing material 200, they are not crushed and broken by the gapping material.

After the counter substrate 3 and the TFT array substrate 2 are aligned so that the second electrodes 48 formed on the counter substrate 3 for continuity between the substrates face the first electrodes 47 formed on the TFT array substrate 2 for continuity between the substrates and the conducting member 56 and the sealing material 200 are set by ultraviolet irradiation from the side of the counter substrate 3 to the sealing material 200, or by heating, while the protrusion 21 is slightly depressed to have a height of approximately 2 $\mu$m by pressing the counter substrate 3 against the TFT array substrate 2.

While the conducting member 56 and the sealing material 200 may be set together after being applied, they may be applied and set separately. Setting may be performed in two stages, temporary setting and permanent setting.

As a result, as shown in FIGS. 1 to 3, the counter substrate 3 and the TFT array substrate 2 are bonded with a gap of 2 $\mu$m therebetween while the protrusion 21 is interposed as a spacer therebetween. In addition, the first electrodes 47 formed on the TFT array substrate 2 for continuity between the substrates and the second electrodes 48 formed on the counter substrate 3 for continuity between the substrates are electrically connected via the conducting member 56.

After the counter substrate 3 arid the TFT array substrate 2 are thus bonded, the pressure in the area inside the sealing material 200 is reduced, the electro-optical material 39 is injected through the electro-optical material inlet 241 under reduced pressure, and the electro-optical material inlet 241 is then filled with the sealant 242.

In this way, the protrusion 21 formed on the TFT array substrate 2 is interposed in an elastically deformed state between the TFT array substrate 2 and the counter substrate 3 in this embodiment, thereby controlling the gap (cell gap) between the substrates. Therefore, even if the gap is small, for example, 2 $\mu$m, it can be controlled more precisely than in the structure in which the gap is controlled by the gapping material contained in the sealing material. Furthermore, since the protrusion 21 is formed to surround the image display region 37, the gap is controlled over the entire image display region 37, and the gap between the substrates does not vary from point to point. For this reason, it is possible to achieve an electro-optical panel 1 in which the gap is precise, even if the gap is small, and is uniform over the entire image display region 37. Accordingly, when a display is produced by using the electro-optical panel 1, display quality is improved, for example, the display is uniform, the contrast ratio is high, and the display is bright.

Second Embodiment

Figure 8:
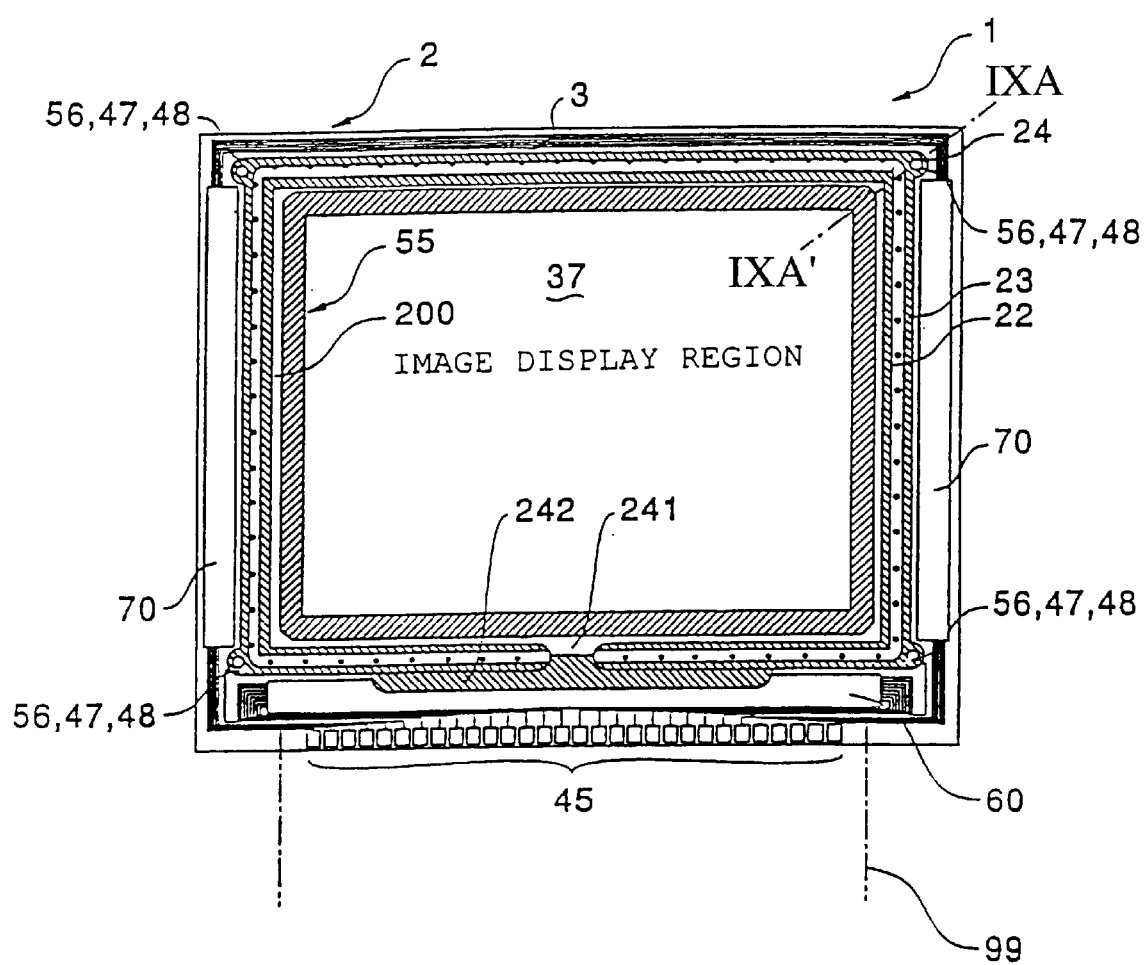
FIG. 8 is a plan view of an electro-optical panel according to a second embodiment of the present invention, as viewed from the side of a counter substrate.
Figure 9B:
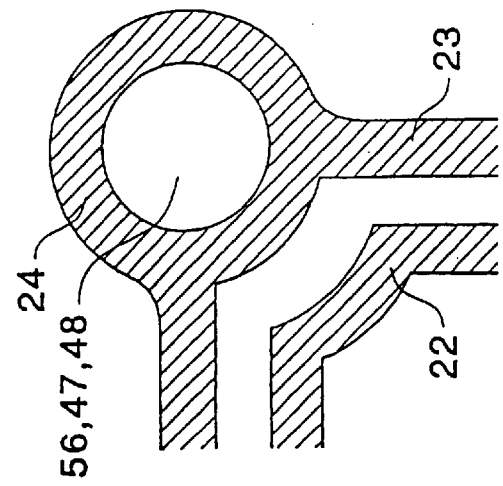
FIGS. 9(A) and 9(B) are a cross-sectional view of the electro-optical panel, and a plan view showing a continuity section between the substrates.
Figure 9A:
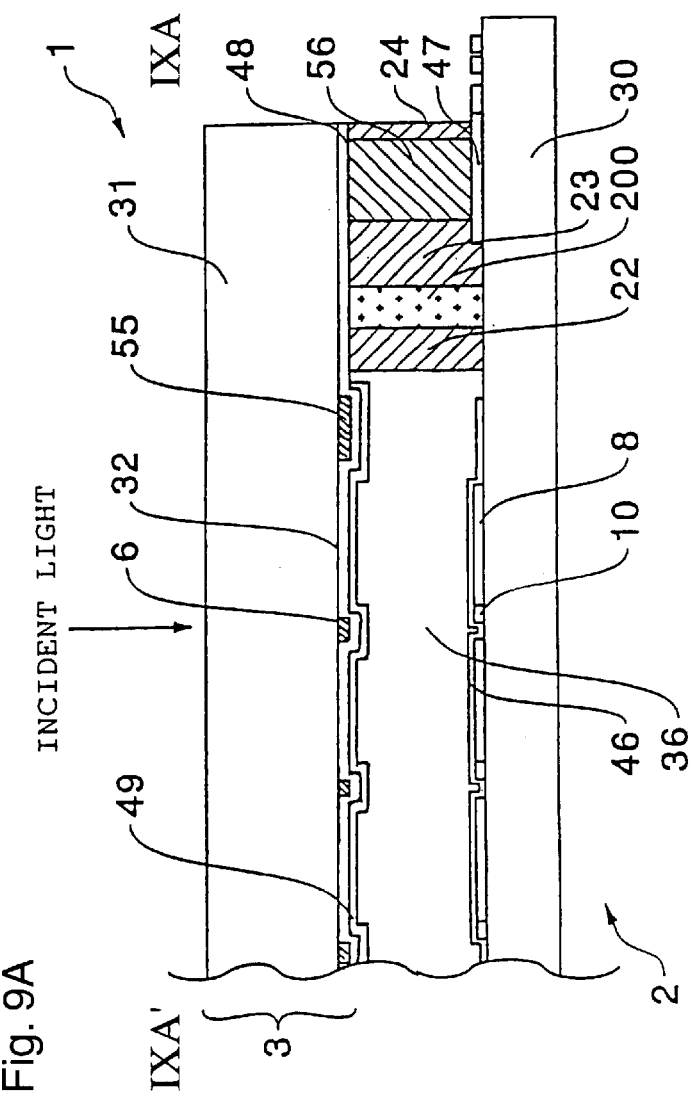

FIG. 8 is a plan view of an electro-optical panel according to this embodiment, as viewed from the side of a counter substrate. FIGS. 9(A) and 9(B) are a sectional view of the electro-optical panel, taken along line IXA—IXA in FIG. 8, and a plan view of a continuity section between substrates. FIGS. 10(A) and 10(B) are a sectional view of the electro-optical panel showing a state immediately before the substrates are bonded, as shown in FIG. 9, and a plan view of the continuity section between the substrates. In the electro-optical panel of this embodiment, components common to the electro-optical panel of the first embodiment are denoted by the same numerals, and a description thereof is omitted.

While the protrusion 21 for controlling the cell gap is formed only along the inner peripheral edge of the formation area of the sealing material 200 in the first embodiment, an inner peripheral protrusion 22 and an outer peripheral protrusion 23 are formed along both the inner and outer peripheral edges of a formation area of a sealing material 200 on the surface of a TFT array substrate 2 in this embodiment, as shown in FIGS. 8 and 9(A). Moreover, in this embodiment, the outer peripheral protrusion 23 is provided with circular portions 24 for enclosing formation areas of a conducting member 56 for establishing continuity between the substrates, as shown in FIG. 9(B). While the circular portions 24 for enclosing the formation areas of the conducting member 56 are formed integrally with the outer peripheral protrusion 23 in this embodiment, they are sometimes formed independently.

A production method for the electro-optical panel 1 having such a configuration will be described with reference to FIGS. 9(A) 9(B) 10(A) and 10(B) and a method for ensuring a predetermined gap between the substrates will be described in detail.

When producing the electro-optical panel 1 of this embodiment, first, a shielding film 6, counter electrodes 32, and an alignment film 49 made of polyimide resin are formed on the surface of a silica glass 31 used in a counter substrate 3, as shown in FIG. 10(A).

On the other hand, TFTs 10, pixel electrodes 8, and the like are formed on the surface of a silica glass 30 used in the TFT array substrate 2.

After a resin, which is elastically deformable even after being set, is applied on the overall surface of the TFT array substrate 2, it is patterned by photolithography, whereby the inner peripheral protrusion 22 and the outer peripheral protrusion 23 having the circular portions 24 are formed to surround an image display region 37. When the target gap between the substrates is 2 $\mu$m, the inner peripheral protrusion 22 and the outer peripheral protrusion 23 are formed to have a slightly larger thickness than the target gap (2 $\mu$m). As shown in FIG. 10(B), the circular portions 24 are formed at the corners of the outer peripheral protrusion 23 so as to surround first electrodes 47 for establishing continuity between the substrates via the conducting member 56.

Next, a polyimide resin 46 is applied on the surface of the TFT array substrate 2, is subjected to rubbing, and is made into an alignment film.

Subsequently, an unset sealing material 200 is discharged from a dispenser and is applied into an area of the surface of the TFT array substrate 2 placed between the inner peripheral protrusion 22 and the outer peripheral protrusion 23. Moreover, an unset conducting member 56 for continuity between the substrates is discharged from a dot dispenser and is applied into areas enclosed by the circular portions 24 of the outer peripheral protrusion 23. In this embodiment, a photo-curable or thermosetting adhesive component of epoxy resin or acrylic resin containing conductive particles of silver powders or gold-plated fibers is also used as the conducting member 56. A photo-curable or thermosetting adhesive of epoxy resin or acrylic resin is used as the sealing material 200. The sealing material 200 does not contain a gapping material.

After the counter substrate 3 and the TFT array substrate 2 are aligned so that second electrodes 48 formed on the counter substrate 3 for continuity between the substrates face the first electrodes 47 formed on the TFT array substrate 2 for continuity between the substrates, and the conducting member 56 and the sealing material 200 are set by ultraviolet irradiation from the side of the counter substrate 3 to the sealing material 200, or by heating, while the protrusions 22, 23, and circular portions 24 are depressed to have a height of approximately 2 $\mu$m by pressing the counter substrate 3 against the TFT array substrate 2.

As a result, as shown in FIGS. 8, 9(A) and 9(B) the counter substrate 3 and the TFT array substrate 2 are bonded with a predetermined gap therebetween. Furthermore, the first electrodes 47 formed on the TFT array substrate 2 for continuity between the substrates and the second electrodes 48 formed on the counter substrate 3 for continuity between the substrates are electrically connected via the conducting member 56.

In this embodiment, the inner peripheral protrusion 22 and the outer peripheral protrusion 23 formed on the TFT array substrate 2 are contacted with the counter substrate 3 to control the gap (cell gap) between the substrates. Therefore, it is possible to control the gap more precisely than in the structure in which the gap is controlled by the gapping material contained in the sealing material. Since the inner peripheral protrusion 22 and the outer peripheral protrusion 23 are formed to surround the image display region 37, the gap between the substrates does not vary on the overall image display region 37. For this reason, it is possible to achieve the electro-optical panel 1 in which the gap is precise and is uniform on the overall image display region 37.

Since the unset sealing material 200 is applied in the area disposed between the inner peripheral protrusion 22 and the outer peripheral protrusion 23, it does not extrude into an undesirable area when applied and when heated. Furthermore, since the unset conducting member 56 is applied to the inside of the circular portion 24 of the outer peripheral protrusion 23, it does not extrude in to an undesirable area when applied and when heated. For this reason, a thermosetting adhesive component can be used for the sealing material 200 and the conducting member 56. When the thermosetting adhesive component is used as the sealing material 200 or the conducting member 56, the polyimide resins 46 and 49 for forming the alignment films are prevented from being deteriorated due to ultraviolet irradiation, which is different from a case using a ultraviolet-curing material. For this reason, it is unnecessary to perform a troublesome step of shielding a predetermined area during ultraviolet irradiation. The use of a ultraviolet-curing sealing material 200 has a limitation, that is, various circuits and wires cannot be formed in an area overlapping with the sealing material 200 so as to allow ultraviolet rays to reach the sealing material 200. In contrast, when the thermosetting sealing material 200 is used, it is possible to efficiently use an area overlapping therewith, and to place various circuits and wires therein. Sealing performance can be enhanced by extending the formation area of the sealing material 200 to a position such as to at least overlap with the shielding film 55 formed around the image display region 37.

Third Embodiment

Figure 11:
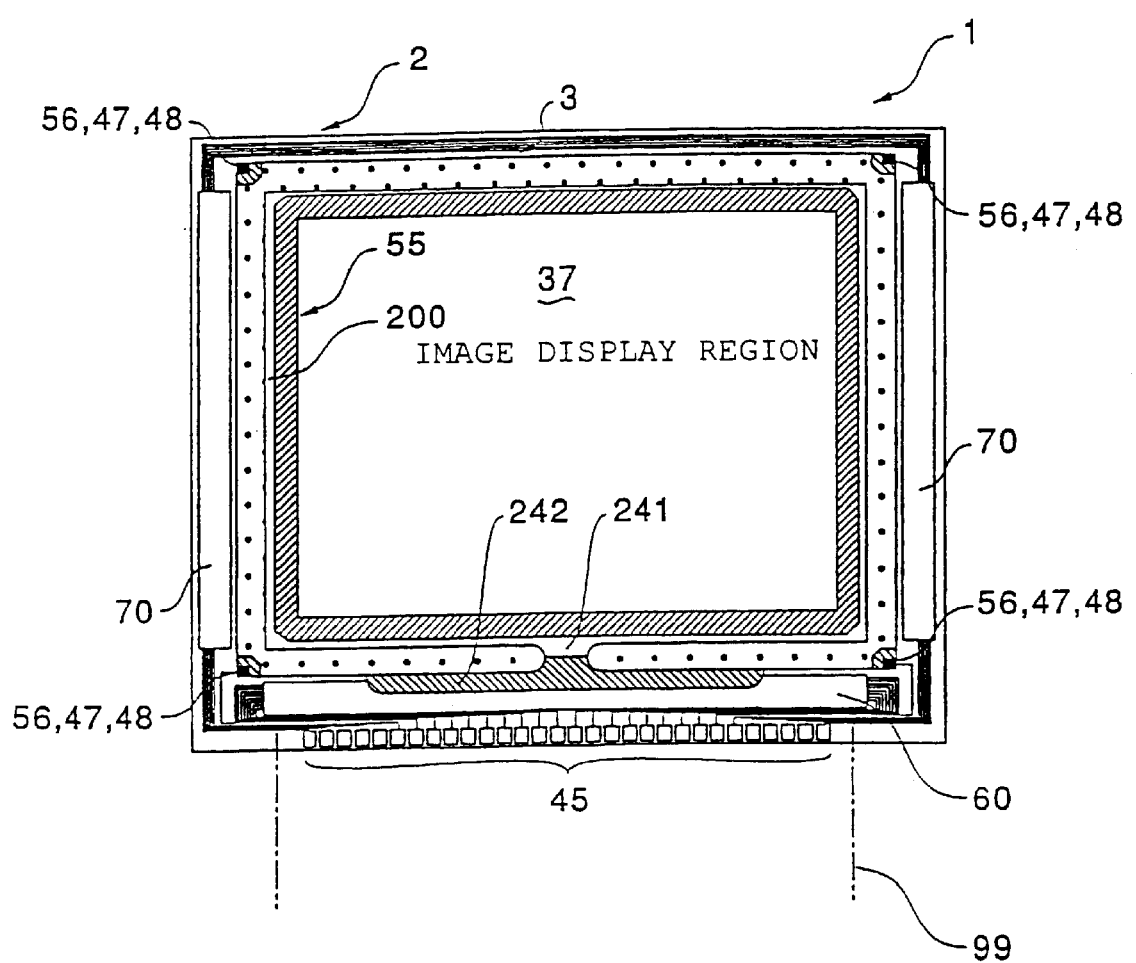
FIG. 11 is a plan view of an electro-optical panel according to a third embodiment of the present invention, as viewed from the side of a counter substrate.
Figure 12:
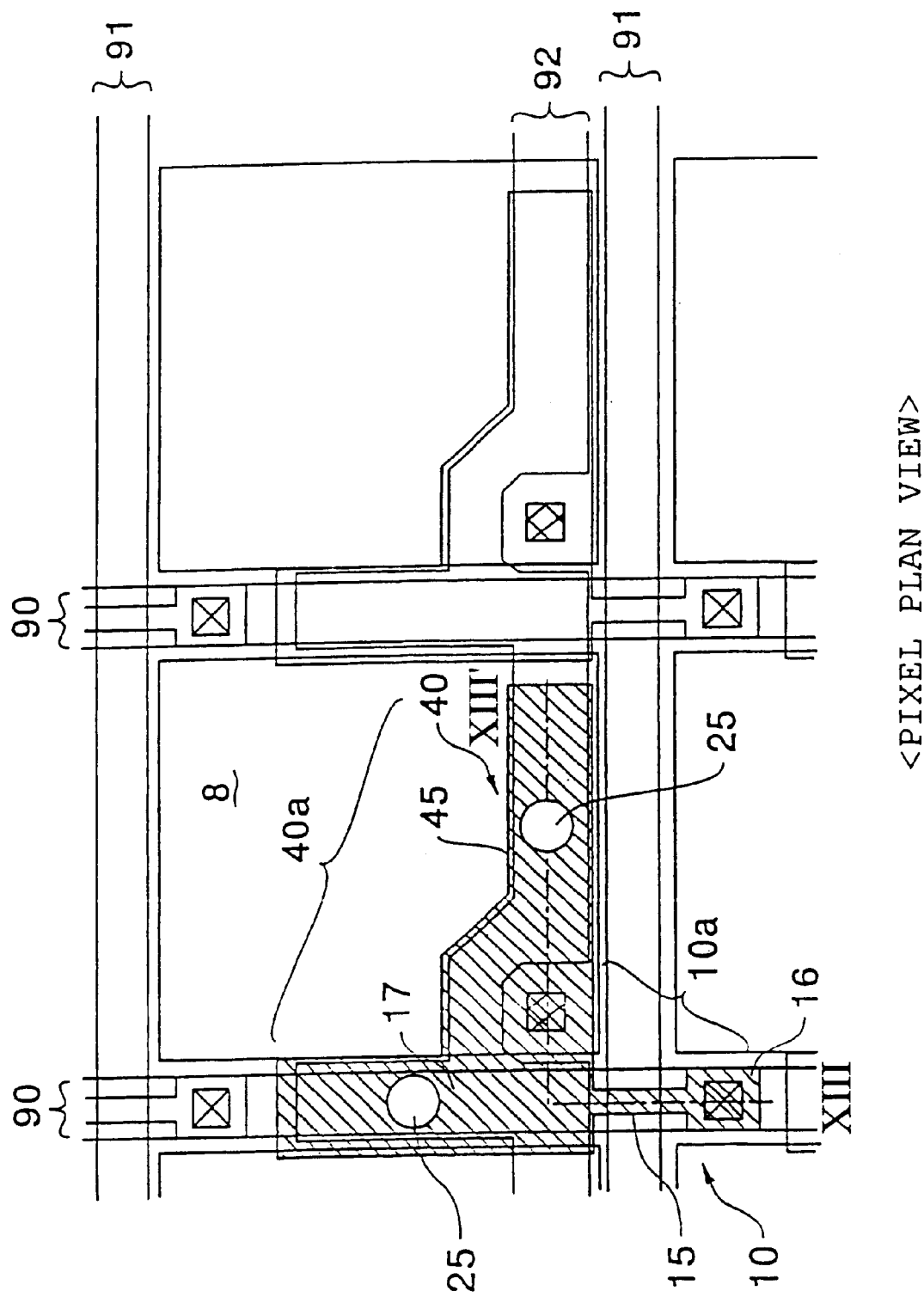
FIG. 12 is a plan view of some of the pixels in the electro-optical panel shown in FIG. 11.
Figure 13:
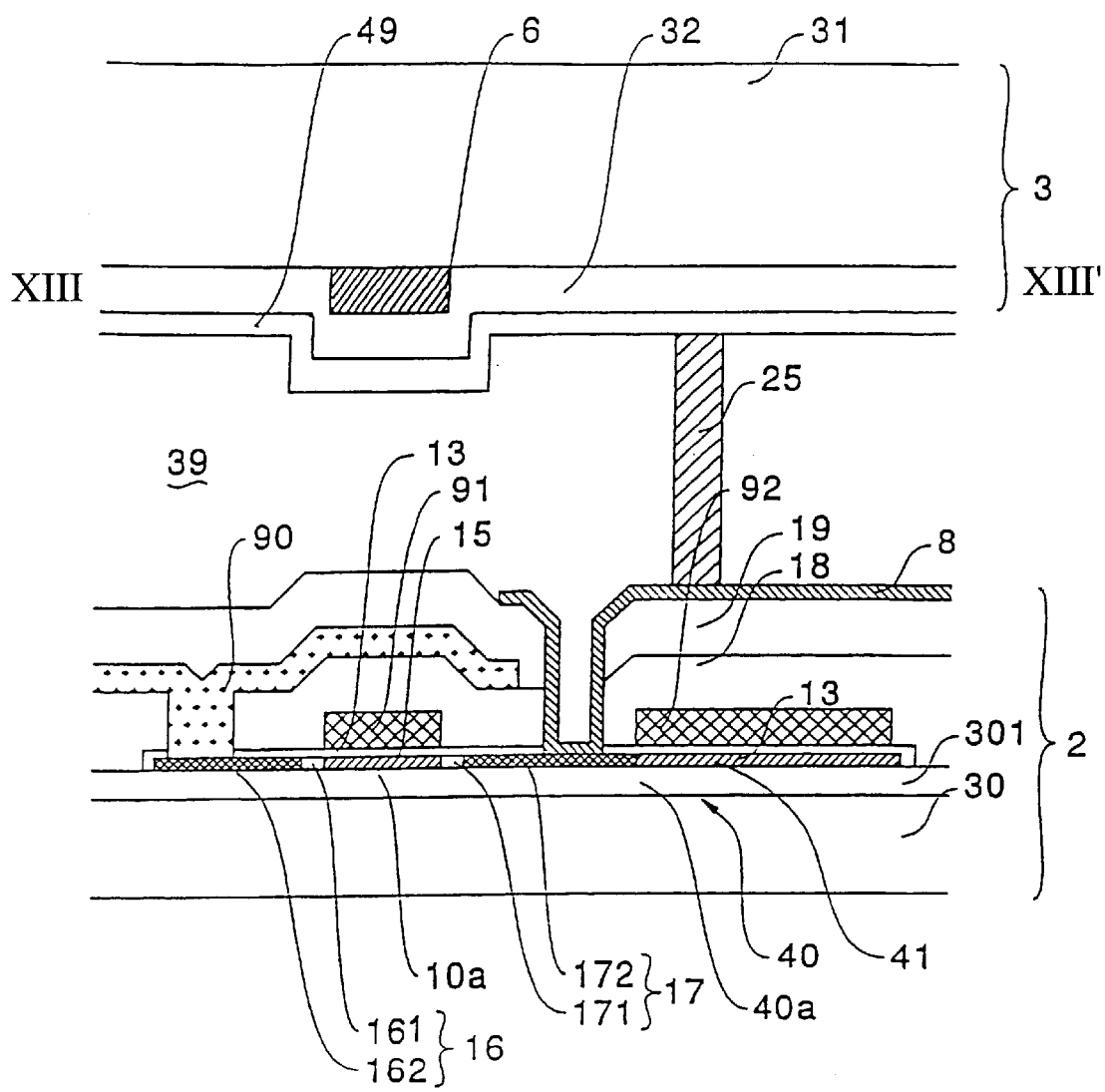
FIG. 13 is a sectional view of the electro-optical panel, taken at a position corresponding to line XIII—XIII in FIG. 12.
Figure 14A:
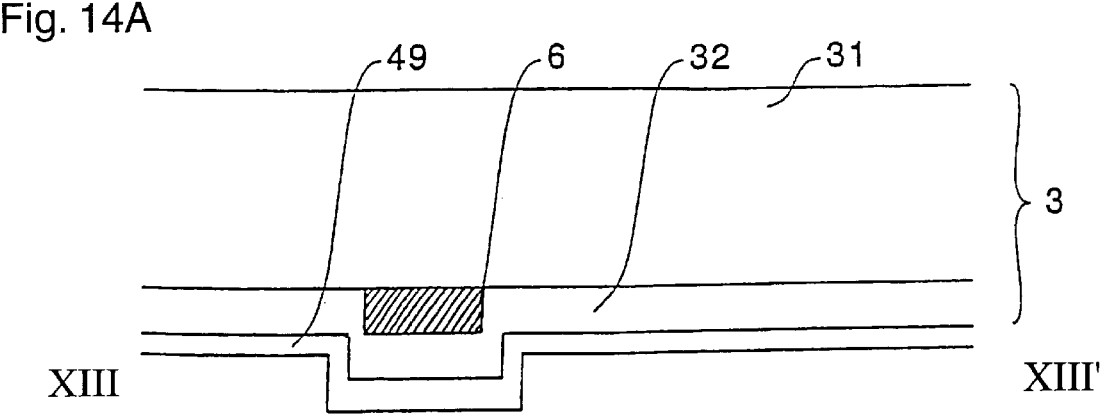
FIG. 14 is a sectional view showing a state before the substrates are bonded, as shown in FIG. 13.
Figure 14B:
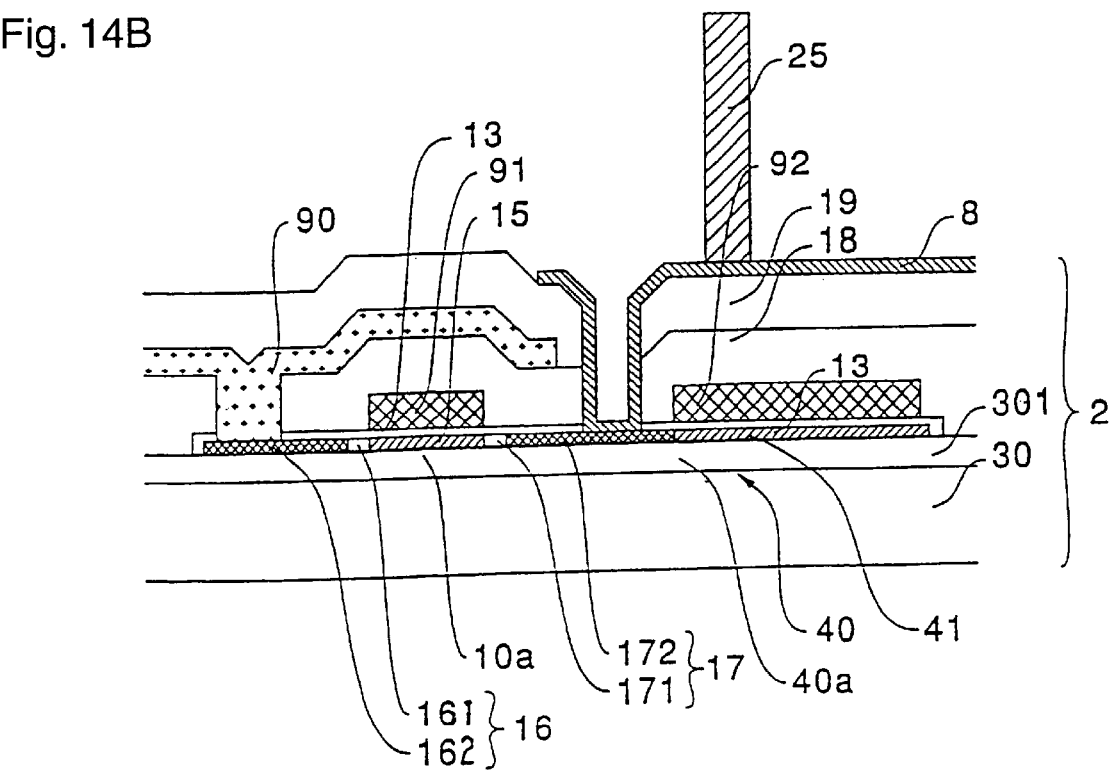

FIG. 11 is a plan view of an electro-optical panel according to this embodiment, as viewed from the side of a counter substrate. FIGS. 12 and 13 are a plan view and a sectional view, respectively, of pixels in the electro-optical panel. FIG. 14 is a sectional view of the pixels, showing a state immediately before substrates are bonded, as shown in FIG. 13. In the electro-optical panel of this embodiment, components common to the electro-optical panel of the first embodiment are denoted by the same numerals, and a description thereof is omitted.

Figure 19:
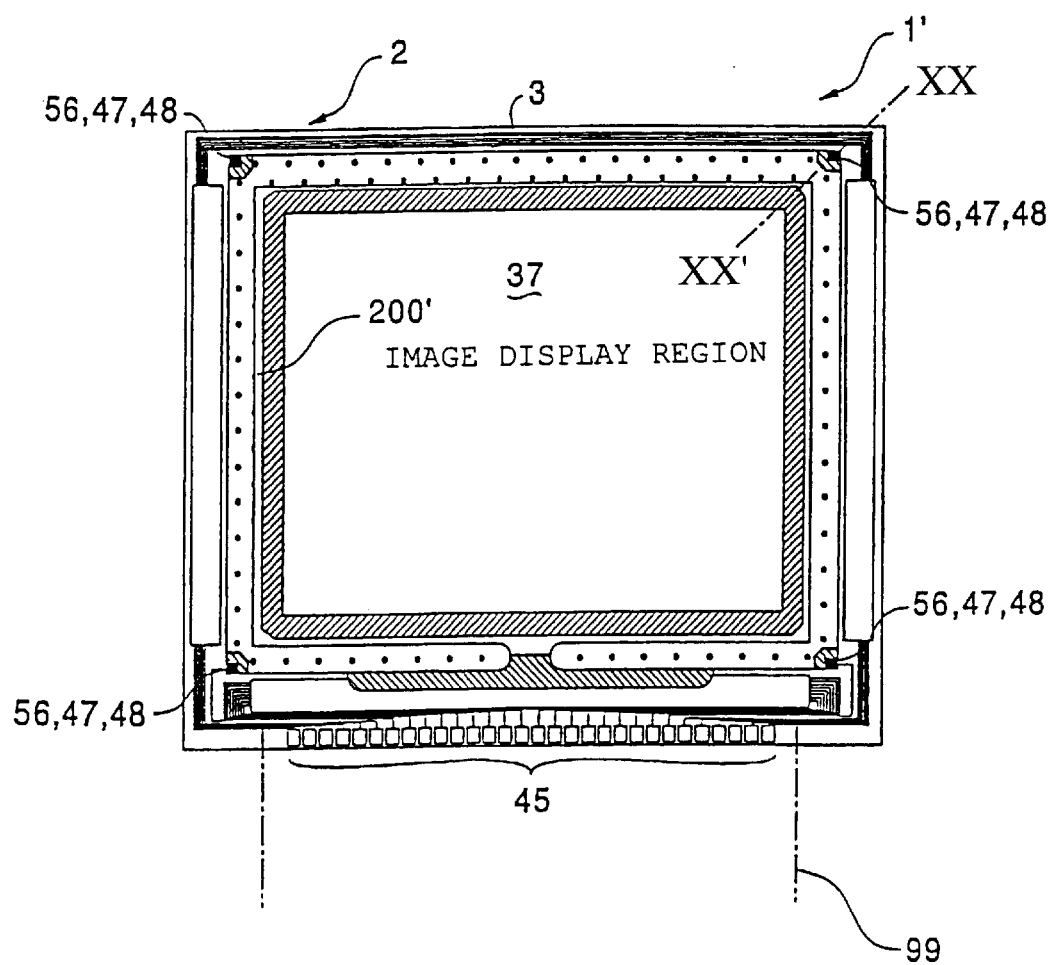
FIG. 19 is a plan view of a conventional electro-optical panel, as viewed from the side of a counter substrate.
Figure 20:
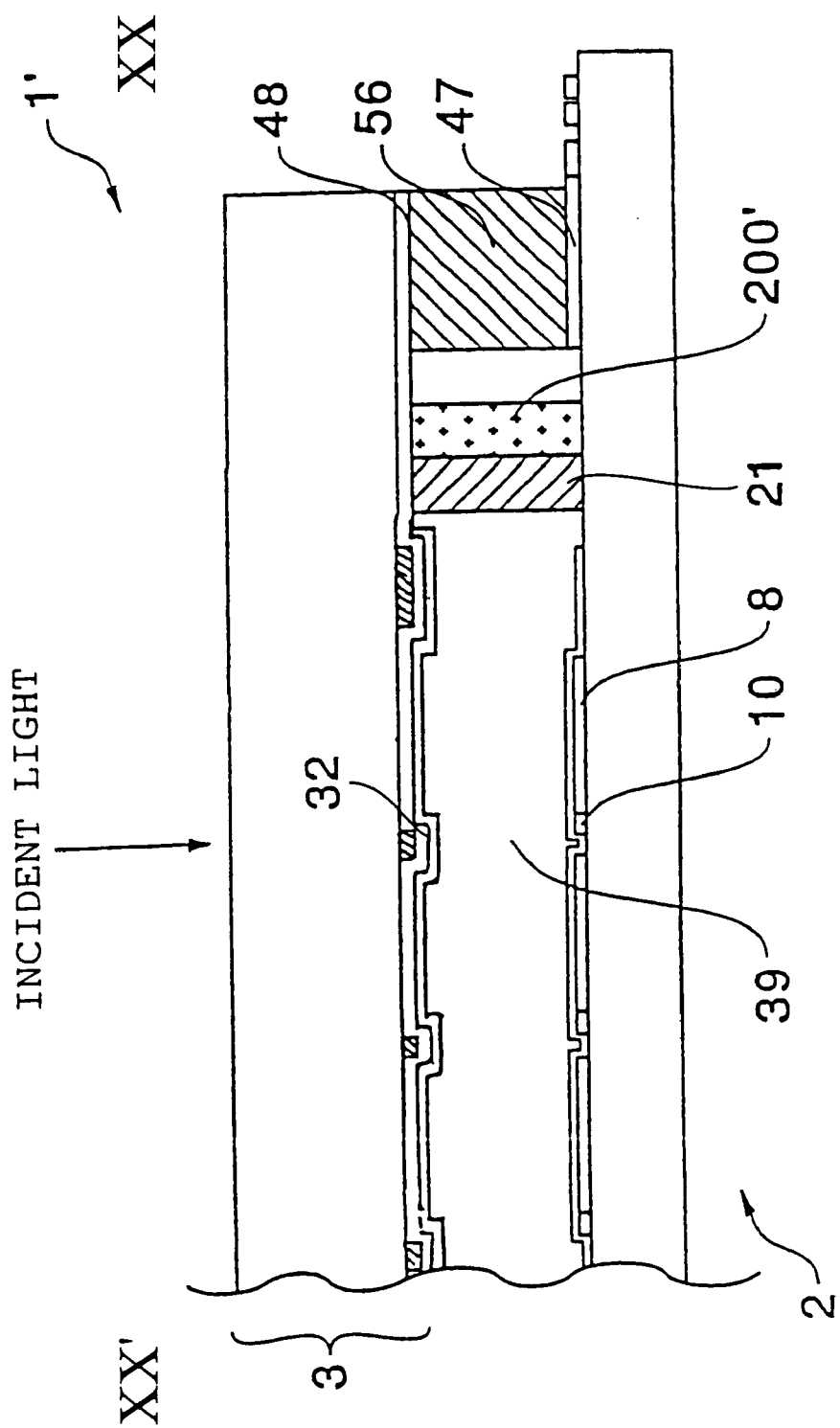
FIG. 20 is a sectional view of the electro-optical panel, taken along line X—X in FIG. 19, and a plan view of a continuity section between the substrates.

While the protrusions 21, 22, and 23 for controlling the cell gap are formed along the formation area of the sealing material 200 in the first and second embodiments, an electro-optical panel of this embodiment is not provided with protrusions or the like formed along the formation area of a sealing material 200 so as to control the cell gap, as shown in FIG. 11, and has almost the same planar shape as that of the conventional electro-optical panel which has been described with reference to FIG. 19.

In this embodiment, as shown in FIGS. 12 and 13, multiple cylindrical protrusions 25 are formed at predetermined dotted positions in an image display region 37 of a liquid crystal panel 1. These multiple protrusions 25 are interposed between a TFT array substrate 2 and a counter substrate 3 bonded by a sealing material 200, thereby ensuring a predetermined gap between the substrates. In this embodiment, the protrusions 25 are formed in non-aperture areas, which do not transmit light, of the pixels formed in the image display region 37. That is, the protrusions 25 are formed in the pixel area described with reference to FIG. 5, where the storage capacitance 40 is formed by using the silicon film 40$a$ (semiconductor film/diagonally shaded area in FIG. 5) corresponding to the extended portion of the silicon film 10$a$ (semiconductor film/diagonally shaded area in FIG. 5) for forming the TFT 10 for pixel switching and the capacitance line 92.

A production method for the electro-optical panel 1 having such a configuration will be described with reference to FIGS. 11, 12, 13, and 14, and a method for ensuring a predetermined gap between the substrates will be described in detail.

When producing the electro-optical panel 1 of this embodiment, first, a shielding film 6, counter electrodes 32, and an alignment film made of polyimide resin 49 are formed on the surface of a silica glass 31 used in the counter substrate 3, as shown in FIG. 14.

On the other hand, TFTs 10, pixel electrodes 8, and the like are formed on the surface of a silica glass 30 used in the TFT array substrate 2.

After a resin, which is elastically deformable even after being set, is applied on the overall surface of the TFT array substrate 2, it is patterned by using photolithography, as shown in FIGS. 12 and 14, whereby the cylindrical protrusions 25 are formed in relatively flat areas on the surface of the TFT array substrate 2 where the storage capacitances 40 are formed. When a target gap between the substrates is 2 $\mu$m, the protrusions 25 are formed to have a slightly larger thickness than the target gap (2 $\mu$m).

Next, a polyimide resin 46 is applied on the surface of the TFT array substrate 2, is subjected to rubbing, and is made into an alignment film.

Subsequently, as shown in FIG. 11, an unset sealing material 200 is discharged from a dispenser and is applied onto an area of the surface of the TFT array substrate 2 which overlaps with the outer peripheral edge of the counter substrate 3. Moreover, an unset conducting member 56 for continuity between the substrates is discharged from a dot dispenser and is applied on the outer periphery of the application area of the sealing material 200. In this embodiment, a photo-curable or thermosetting adhesive component of epoxy resin or acrylic resin containing conductive particles, such as silver powders or gold-plated fibers, is also used as the conducting member 56. A photo-curable or thermosetting adhesive of epoxy resin or acrylic resin is used as the sealing material 200. The sealing material 200 to be used may contain a gapping material, or may contain no gapping material. When the sealing material 200 containing no gapping material is used, even if wires are disposed on the lower side of the sealing material 200, they are prevented from being crushed and broken by the gapping material.

After the counter substrate 3 and the TFT array substrate 2 are aligned so that second electrodes 48 formed on the counter substrate 3 for continuity between the substrates face first electrodes 47 formed on the TFT array substrate 2 for continuity between the substrates, and the conducting member 56 and the sealing material 200 are set by ultraviolet irradiation from the side of the counter substrate 3 to the sealing material 200, or by heating, while the protrusions 25 are slightly depressed to have a height of approximately 2 μm by pressing the counter substrate 3 against the TFT array substrate 2, as shown in FIG. 13.

As a result, as shown in FIGS. 11 and 13, the counter substrate 3 and the TFT array substrate 2 are bonded with a predetermined gap therebetween. Furthermore, the first electrodes 47 formed on the TFT array substrate 2 for continuity between the substrates and the second electrodes 48 formed on the counter substrate 3 for continuity between the substrates are electrically connected via the conducting member 56.

After the counter substrate 3 and the TFT array substrate 2 are bonded in this way, the pressure in the area inside the sealing material 200 is reduced, an electro-optical material 39, such as liquid crystal, is injected through an electro-optical material inlet 241 under reduced pressure so as to fill the area, and the electro-optical material inlet 241 is filled with a sealant 242. In this case, since the protrusions 25 are cylindrical, the electro-optical material 39, such as liquid crystal, smoothly flows along the protrusions 25 without being hindered thereby, and is filled appropriately. Therefore, insufficient filling of the electro-optical material 39 does not occur.

In this embodiment, the gap (cell gap) between the substrates is thus controlled by contacting the protrusions 25 formed on the TFT array substrate 2 with the counter substrate 3, and this makes it possible to control the gap more precisely than in the structure in which the gap is controlled by the gapping material contained in the sealing material. Since the protrusions 25 are placed at multiple dotted points in the image display region 37 between the TFT array substrate 2 and the counter substrate 3, the gap between the substrates does not vary over the entire image display region 37. For this reason, it is possible to achieve the electro-optical panel 1 in which the gap is precise, even if the gap is small, and is uniform over the entire image display region 37.

Since the protrusions 25 serving as spacers are incorporated in the TFT array substrate 2, they can be selectively formed only in non-aperture areas of the pixels, which do not transmit light, in order to avoid positions which would deteriorate display quality. This is different from the case in which spacers are scattered throughout the image display region 37. For example, the protrusions 25 may be selectively formed in the flat areas with the storage capacitances 40 formed therein, as in this embodiment. Therefore, even when the electro-optical panel 1 is used as a light valve for a projection display apparatus, the protrusions 25 are not magnified and projected as images.

Since the protrusions 25 are formed at the same position in each pixel (in the formation areas of the storage capacitances 40), that is, at the same coordinates in the pixels, they are formed at the same height in the pixels. For this reason, the protrusions 25 are of the same in height among the pixels, which makes it possible to more reliably make the gap between the substrates uniform. Accordingly, even when the uneven TFT array substrate 2 is used, a uniform gap can be ensured between the TFT array substrate 2 and the counter substrate 3.

Improvements in Third Embodiment

Figure 15:
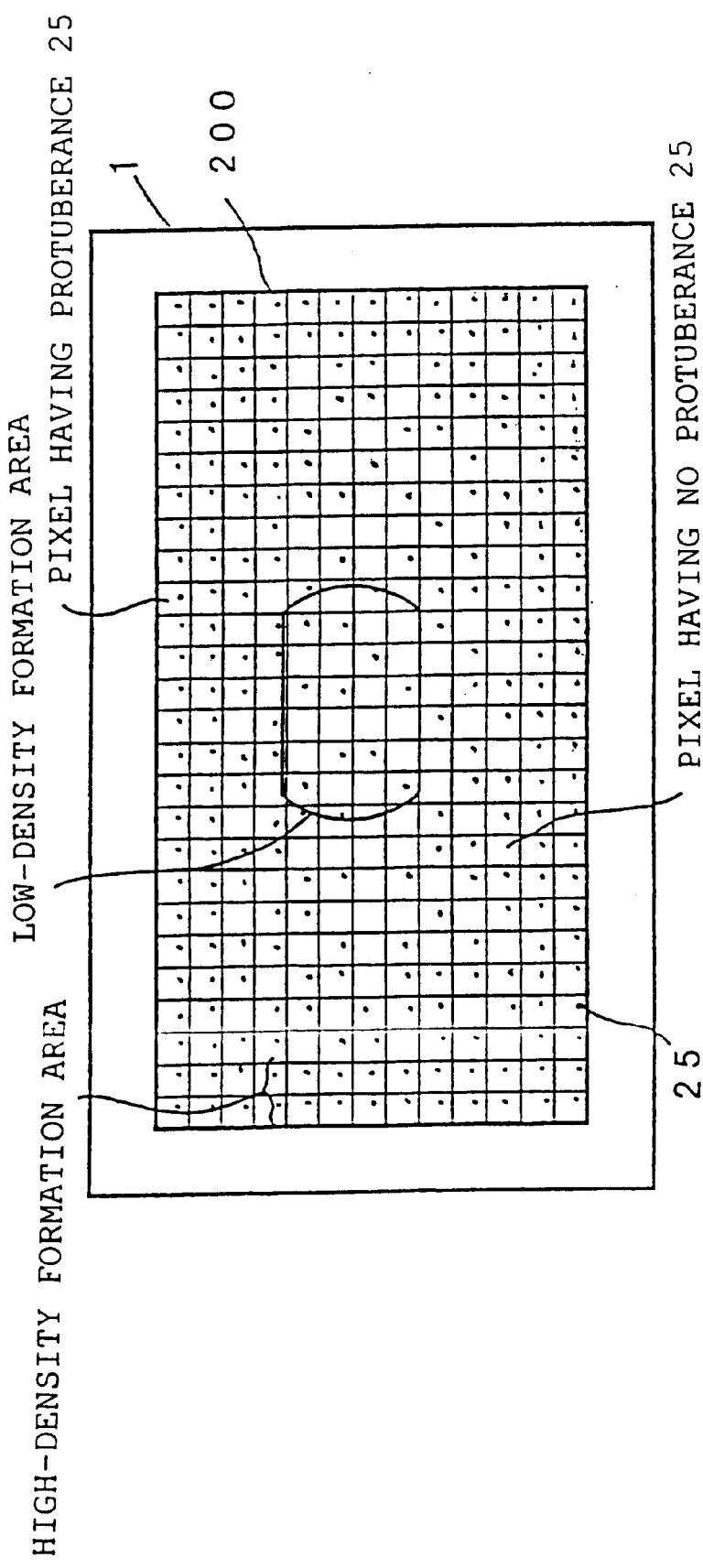
FIG. 15 is an explanatory view showing a distribution of protrusions in an electro-optical panel according to an improvement in the third embodiment of the present invention.
Figure 16:
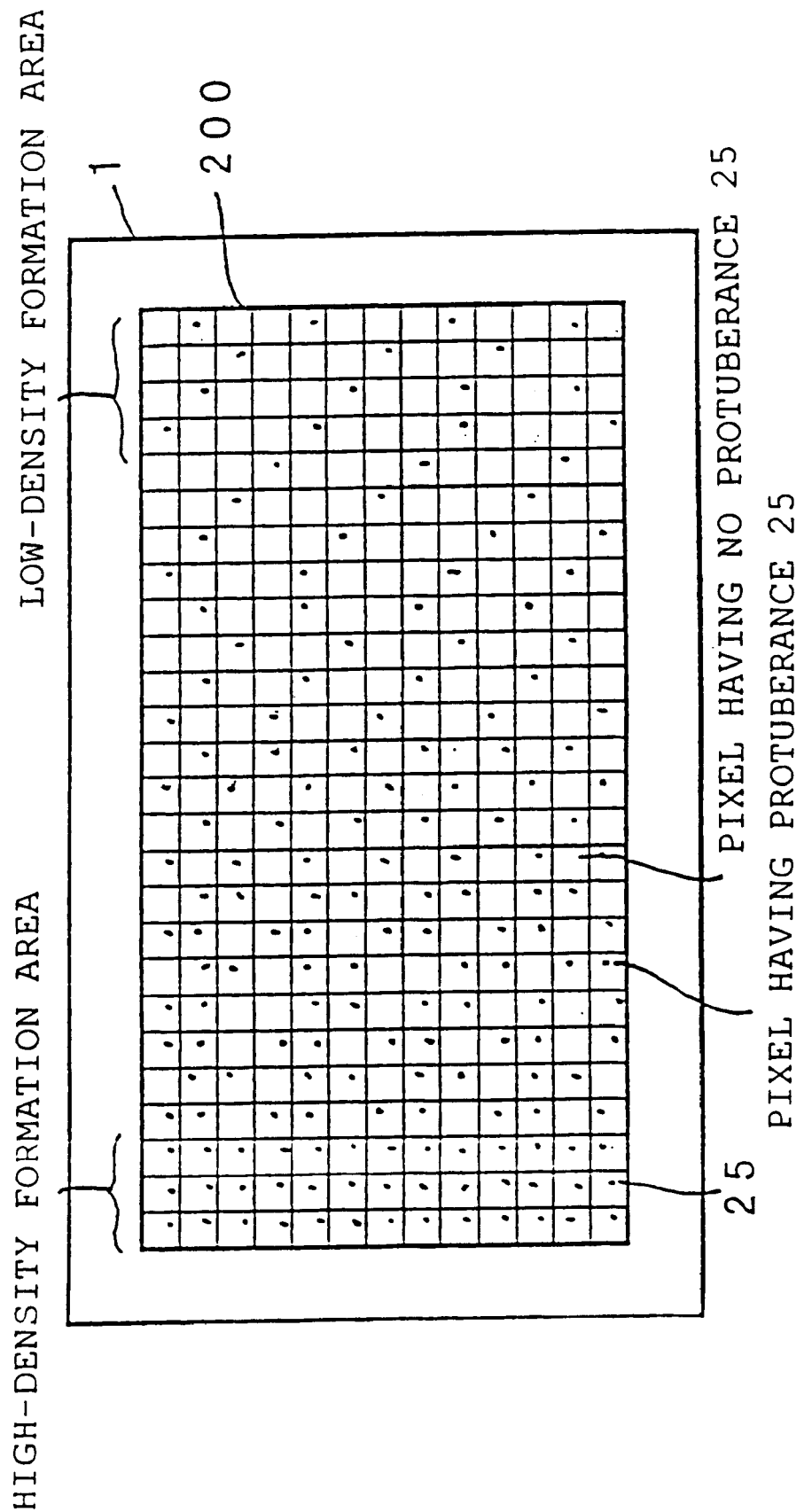
FIG. 16 is an explanatory view showing a distribution of protrusions in an electro-optical panel according to another improvement in the third embodiment of the present invention.

FIG. 15 is an explanatory view showing a distribution of protrusions in an electro-optical panel according to an improvement in the third embodiment, and FIG. 16 is an explanatory view showing a distribution of protrusions in an electro-optical panel according to another improvement in the third embodiment.

The cylindrical protrusions 25 are formed at a constant density in the image display region 37 of the electro-optical panel 1 of the third embodiment. In contrast, in the improvements described herein, protrusions 25 are formed at high density in specific areas of an image display region 37, and at low density in the other areas.

That is, in the improvement shown in FIG. 15, protrusions 25 (shown by black dots in FIG. 15) are formed in all of the pixels in the peripheral part, serving as a high-density formation area, of an image display region 37 of an electro-optical panel 1 including multiple pixels arranged in a matrix, and are formed only in some of the pixels in the central part serving as a low-density formation area In such a configuration, the gap between the substrates is small in the central area of the image display region 37 immediately after the substrates are bonded. That is, the center of the electro-optical panel 1 sometimes bulges according to the timing at which an electro-optical material, such as liquid crystal, is injected between the substrates, whereas the substrates can be bonded in anticipation of such bulging. That is, when an electro-optical material 39 is injected into the image display region 37 under reduced pressure, even if the central area bulges slightly and the gap thereat increases, such an increase is absorbed and reduced by the difference in gap before the electro-optical material 39 is injected. For this reason, it is possible to make the gap between the substrates uniform over the entire image display region 37.

In a manner for changing the formation density of the protrusions 25, when the pressing force tends to vary from point to point in a device in which the counter substrate 3 is pressed against the TFT array substrate 2 when bonded to the TFT array substrate 2, the protrusions 25 are formed in a distribution such as to cancel such variations, as shown in FIG. 16. For example, when the pressing force toward the TFT array substrate 2 is large on the left side in FIG. 16 and is small on the right side, the number of pixels having the protrusions 25 is increased in the left area of the image display region 37 in FIG. 16 serving as a high-density formation area of the protrusions 25, and for example, all the pixels are provided with protrusions 25. In contrast, only some of the pixels are provided with protrusions 25 in the right area in FIG. 16 serving as a low-density formation area of the protrusions 25.

In such a configuration, even if the pressing force varies from point to point, the density of the protrusions 25 interposed between the counter substrate 3 and the TFT array substrate 2 is set in accordance with the variations. As a result, it is possible to make the gap between the substrates uniform over the entire image display region 37.

Other Embodiments

Figure 17A:
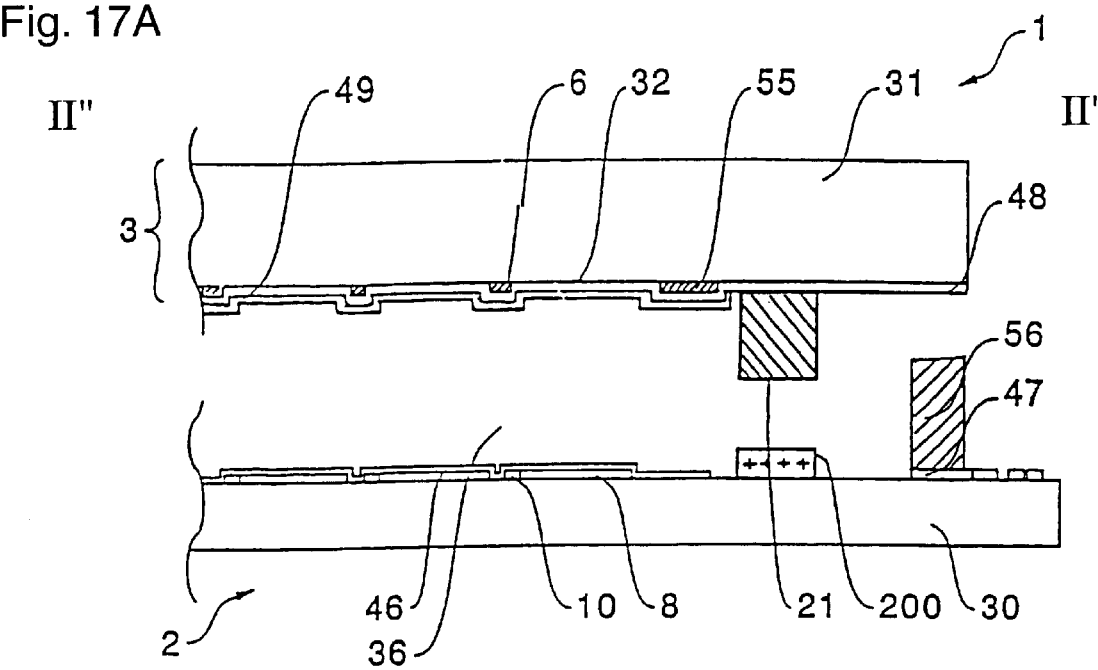
FIGS. 17(A) and 17(B) are an explanatory view showing a state in which a protrusion and a sealing material are formed or applied on different substrates in an electro-optical panel according to a modification of the first embodiment of the present invention, and an explanatory view showing a state in which the substrates are bonded.
Figure 17B:
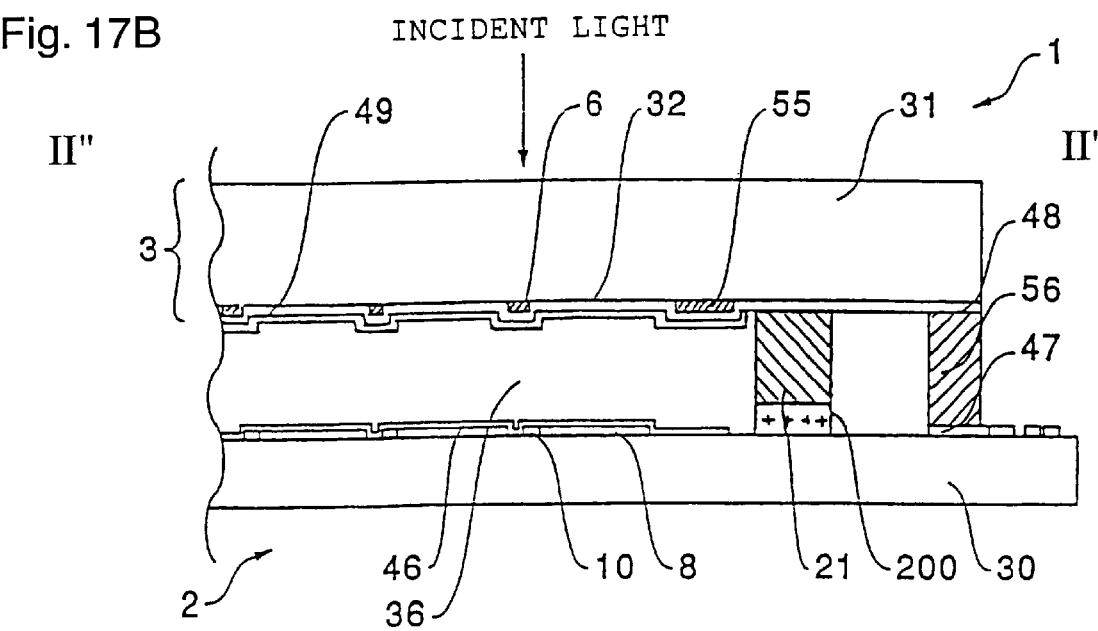

A first modification of the first embodiment is shown in FIG. 17(A). In the first embodiment, the protrusion 21 formed around the sealing material formation area on the TFT array substrate 2, and the sealing material 200 is also formed on the TFT array substrate 2. In contrast, in the modification shown in FIG. 17(A), a protrusion 21 is formed at a predetermined position on a counter substrate 3, a sealing material 200 is formed on a TFT array substrate 2, and the TFT array substrate 2 and the counter substrate 3 are then bonded. In this case, the forming position of the protrusion 21 and the application position of the sealing material 200 may be offset from each other, as in the above-described first embodiment, whereas the sealing material 200 may be applied at a position on the protrusion 21, as in the modification shown in FIG. 17(A). In this case, as shown in FIG. 17(B), the sealing material 200 is interposed between the protrusion 21 and the TFT array substrate 2, and the protrusion 21 and the TFT array substrate 2 are thereby fixedly bonded. Since other structures are similar to those in the above-described first embodiment, corresponding components are denoted by the same numerals, and a description thereof is omitted. While such a configuration may be also adopted in the second and third embodiments, a description thereof is omitted.

Fourth Embodiment

Figure 21:
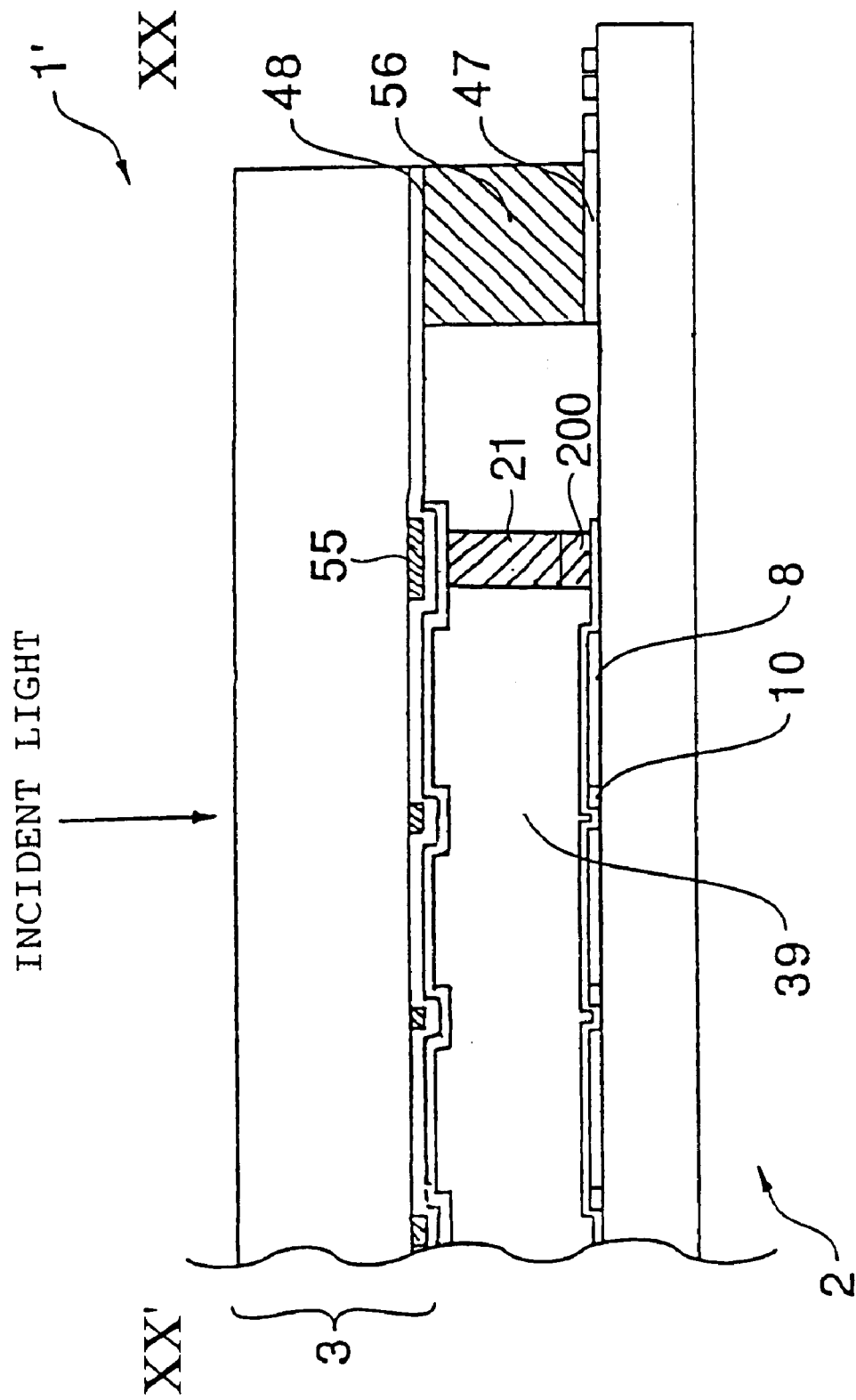
FIG. 21 is an explanatory view showing a state in which substrates are bonded with a protrusion formed therebetween in an electro-optical panel according to a fourth embodiment of the present invention.

A fourth embodiment is shown in FIG. 21. While the protrusion 21 is formed on the inner periphery of the sealing material formation area on the TFT array substrate 2 and the sealing material 200 is also formed on the TFT substrate 2 in the fourth embodiment, a protrusion is formed on a counter substrate 3 or a TFT array substrate 2 so as to face a shielding film 55 formed around the display region, and the TFT array substrate 2 and the counter substrate 3 are then bonded in the fourth embodiment shown in FIG. 21. The shielding film 55 is a film formed to separate the display region having pixels formed in a matrix, and its peripheral non-display region. In this case, the forming position of the protrusion 21 and the application position of the shielding film 55 may be offset from each other, whereas the gap between the substrates can be controlled by the protrusion 21 without any influence of unevenness of the shielding film 55 by forming the protrusion 21 so as to be held within the width of the shielding film 55. Furthermore, since the protrusion 21 is superimposed on and is concealed by the shielding film 55 in plan view, the influence of the protrusion 21 on the display can be avoided. The protrusion 21 may be similarly formed along the shielding film 55 so as to surround the non-display region, or may be dotted along the shielding film 55. The sealing material 200 is thus interposed between the protrusion 21 and the TFT array substrate 2, and the protrusion 21 and the TFT array substrate 2 are fixedly bonded. Alternatively, the TFT array substrate and the counter substrate may be bonded while protrusions 21 are formed to face the four corners of the shielding film 55 on the TFT array substrate. In this case, the protrusions 21 formed on the TFT array substrate can serve as alignment marks for bonding to the counter substrate. Since other structures are similar to those in the above-described first embodiment, corresponding components are denoted by the same numerals, and a description thereof is omitted.

Application of Electro-optical Panel to Electronic Equipment

Figure 18:
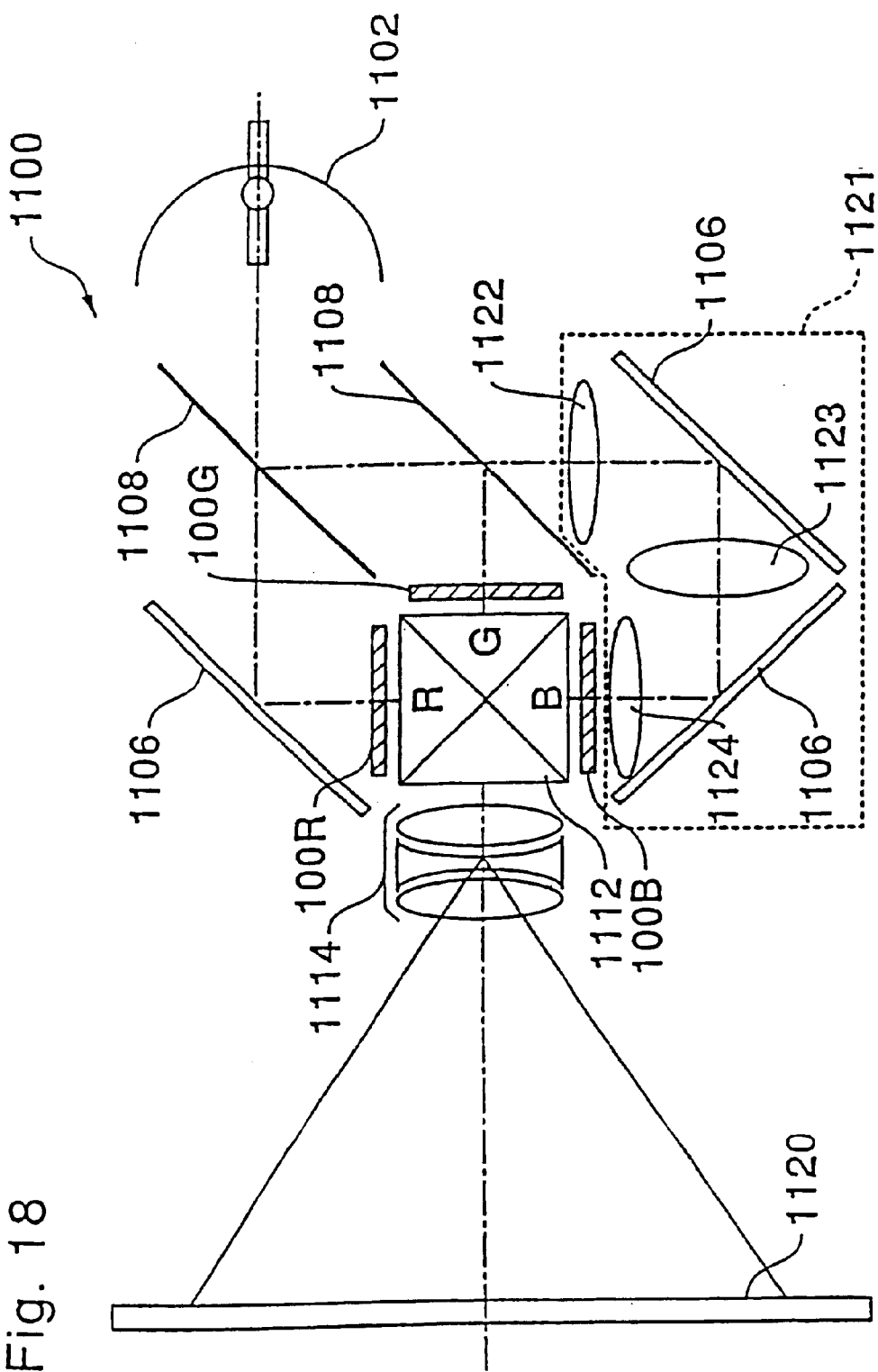
FIG. 18 is a general structural view of a projection display apparatus (projector) as an application of the electro-optical panel to which the present invention is applied.

A projection display apparatus will now be described as an example of an electronic equipment having the electro-optical panel 1. FIG. 18 is a general structural view of a projection display apparatus (electro-optical device) showing an application of the electro-optical panel 1 to which the present invention is applied.

Referring to FIG. 18, a projection display apparatus 1100 is a projector in which the electro-optical panel 1 is applied to light valves 100R, 100G, and 100B for R, G, and B colors. In this liquid crystal projector 1100, projection light is emitted from a lamp unit 1102 formed of a white light source, such as a metal halide lamp, is separated into light components R, G, and B corresponding the three primary colors by three mirrors 1106 and two dichroic mirrors 1108, and is directed to the light valves 100R, 100G, and 100B corresponding to the colors. In this case, in particular, the B light is directed via a relay lens system 1121 composed of an incident lens 1122, a relay lens 1123, and an emitting lens 1124 in order to prevent light loss due to its long light path. The light components corresponding to the three primary colors, which are modulated by the light valves 100R, 100G, and 100B, are synthesized again by a dichroic prism 1112, and are then projected as a color image onto a screen 1120 via a projection lens 1114.

Industrial Applicability

As described above, since the gap (cell gap) between the substrates is controlled by contacting the protrusion formed on one of the substrates with the other substrate in the present invention, it is possible to control the gap more precisely than in the structure in which the gap is controlled by the gapping material contained in the sealing material. Since the protrusion surrounds the image display region, the gap between the substrates does not vary over the entire image display region. For this reason, it is possible to achieve an electro-optical panel in which the gap is precise, even if the gap is small, and is uniform over the entire image display region. Since it is unnecessary for the sealing material to contain the gapping material, even when wires are disposed on the lower side of the sealing material, they are prevented from being crushed and broken by the gapping material.

What is claimed is:

1. An electro-optical panel, comprising:

a pair of substrates;

an electro-optical material held between said pair of substrates;

a sealing material that fixedly bonds said pair of substrates;

an image display region composed of a plurality of pixels formed inside an area where said sealing material is formed; and an elastically deformable member contacted between said pair of substrates, said elastically deformable member comprising a first elastically deformable member formed along an inner peripheral edge of said sealing material and a second elastically deformable member formed along an outer peripheral edge of said sealing material.

2. The electro-optical panel according to claim 1, said elastically deformable member being depressed between said pair of substrates.

3. The electro-optical panel according to claim 1, further comprising a shielding film formed on a periphery of said image display region that overlaps with at least a part of said sealing material.

4. The electro-optical panel according to claim 1, said pair of substrates comprising:

a transistor array substrate having pixel electrodes and thin-film transistors for pixel switching formed in a matrix; and a counter substrate having counter electrodes.

5. A magnified projection display apparatus, comprising:

the electro-optical panel according to claim 4;

a light source;

a light-collecting optical system that guides light emitted from said light source to said electro-optical panel; and a magnified projection optical system that magnifies and projects light modulated by said electro-optical panel.

6. An electro-optical panel production method for producing the electro-optical panel according to claim 1, comprising the steps of:

forming said first elastically deformable member along an inner peripheral edge of said sealing material formation area;

forming said second elastically deformable member along an outer peripheral edge of said sealing material formation area;

applying said sealing material; and setting said sealing material while pressing said pair of substrates.

7. An electro-optical panel, comprising:

a pair of substrates;

an electro-optical material held between said pair of substrates;

a sealing material that fixedly bonds said pair of substrates; and an image display region composed of a plurality of pixels formed inside an area where said sealing material is formed;

a conducting member connected between conductive layers respectively formed on said pair of substrates; and an elastically deformable member contacted between said pair of substrates, said elastically deformable member being formed around a formation area of said conducting member, said elastically deformable member being formed to surround said conducting member formation area.

8. An electro-optical panel production method for producing the electro-optical panel according to claim 7, comprising the steps of:

forming said elastically deformable member to surround an area where said conducting member is to be formed;

applying said conducting member in the area surrounded by said elastically deformable member; and simultaneously or separately setting said sealing material and said conducting member while pressing said pair of substrates.

9. An electro-optical panel, comprising:

a pair of substrates, one of said pair of substrates including a scanning line, a data line, a thin film transistor being disposed in correspondence with said scanning line and said data line and a storage capacitance; said storage capacitance being disposed in correspondence with said thin film transistor, said storage capacitance having a capacitor line;

an electro-optical material held between said pair of substrates;

a sealing material that fixedly bonds said pair of substrates; and a protrusion contacted between said pair of substrates, said protrusion formed in a forming area of said capacitor line of a non-aperature area, which does not transmit light.

10. The electro-optical panel according to claim 9, said protrusion formed in a non-aperture area which does not transmit light.

11. The electro-optical panel according to claim 9 said protrusion comprising an elastically deformable material and being depressed between said pair of substrates.

12. A magnified projection display apparatus, comprising:

the electro-optical panel according to claim 9;

a light source;

a light-collecting optical system that guides light emitted from said light source to said electro-optical panel; and a magnified projection optical system that magnifies and projects light modulated by said electro-optical panel.

* * * * *